United States Patent
Inoue et al.

(10) Patent No.: US 6,486,272 B1
(45) Date of Patent: Nov. 26, 2002

(54) PROCESS FOR PRODUCING FUNCTIONAL STYRENE COPOLYMER

(75) Inventors: Tetsuya Inoue, Chiba (JP); Masanori Sera, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,788

(22) PCT Filed: Apr. 18, 2001

(86) PCT No.: PCT/JP01/03302

§ 371 (c)(1),
(2), (4) Date: Dec. 19, 2001

(87) PCT Pub. No.: WO01/79312

PCT Pub. Date: Oct. 25, 2001

(30) Foreign Application Priority Data

Apr. 19, 2000 (JP) ........................................ 2000-117942

(51) Int. Cl.[7] .......................... C08F 4/645; C08F 212/04
(52) U.S. Cl. .......................... 526/75; 526/151; 526/153; 526/160; 526/240; 526/274; 526/279; 526/299; 526/310; 526/347; 525/333.3; 525/383; 525/384
(58) Field of Search .......................... 526/75, 151, 153, 526/160, 240, 347, 274, 279, 299, 310; 525/333.3, 383, 384

(56) References Cited

U.S. PATENT DOCUMENTS 5,153,282 A * 10/1992 Datta et al. .................... 526/75
5,189,125 A * 2/1993 Ishihara et al. .......... 526/347 X
5,202,402 A * 4/1993 Funaki et al. ............ 526/347 X
6,353,070 B1 * 3/2002 Wunsch et al. .............. 526/347

FOREIGN PATENT DOCUMENTS

| EP | 444210 | 9/1991 |
| EP | 505972 | 9/1992 |
| EP | 505997 | 9/1992 |

* cited by examiner

*Primary Examiner*—Fred Teskin
(74) *Attorney, Agent, or Firm*—Oblon, Spivak McClelland, Maier & Neustadt, P.C.

(57) ABSTRACT

A process for producing a styrenic copolymer having a functional group and a syndiotactic configuration is provided. The process comprises bringing a metal compound into interaction with a vinyl compound having a functional group to mask the functional group and copolymerizing the vinyl compound having the masked functional group with a styrenic compound in the presence of a polymerization catalyst comprising (A) a transition metal compound, (B) at least one compound selected from compounds having oxygen and compounds which can form ionic complex compounds by reaction with the transition metal compound and (C) an organometallic compound. A styrenic copolymer which is a random, block or graft copolymer, preferably a random copolymer, of a vinyl compound having a functional group and a styrenic compound and has the repeating units derived from the styrenic compound having the syndiotactic configuration can be produced efficiently. The above styrenic random copolymer exhibits excellent physical properties such as excellent adhesion with various adhesives and excellent compatibility with various rubbers and is advantageously used for various applications as various types of molded articles.

8 Claims, No Drawings

PROCESS FOR PRODUCING FUNCTIONAL STYRENE COPOLYMER

TECHNICAL FIELD

The present invention relates to a process for producing a styrenic copolymer having a functional group and a styrenic copolymer having a functional group. More particularly, the present invention relates to a process for efficiently producing a styrenic copolymer, in particular, a styrenic random copolymer, having a functional group and the syndiotactic configuration and a random styrenic copolymer having a functional group and the syndiotactic configuration and exhibiting improved physical properties such as adhesion with adhesives and compatibility with various rubbers.

BACKGROUND ART

Heretofore, styrenic polymers produced in accordance with the radical polymerization are formed into various shapes in accordance with various molding processes and widely used for home electric appliances, business equipments, utensils, packaging containers, furnitures, toys, synthetic papers and other industrial materials. However, the conventional styrenic polymers have the atactic configuration and have a drawback in that heat resistance and chemical resistance are poor.

To overcome the above drawback of the styrenic polymers having the atactic configuration, the group of investigators in which the present inventors are included succeeded in developing styrenic polymers having a highly syndiotactic configuration. Styrenic copolymers of a styrenic monomer and other monomers having the syndiotactic configuration were also successfully developed. Examples of such polymers and copolymers include syndiotactic copolymers of styrene and substituted styrenes (Japanese Patent Application Laid-Open No. Showa 63(1988)-241009) and syndiotactic copolymers of styrene and polar vinyl monomers (Japanese Patent Application Laid-Open Nos. Heisei 2(1990)-258810, Heisei 2(1990)-258805, Heisei 2(1990)-258812, Heisei 4(1992)-130108, Heisei 4(1992)-185619 and Heisei 4(1992)-298512). Block copolymers of styrene and styrenic compounds having a heteroatom were also developed (Japanese Patent Application Laid-Open No. Heisei 5(1993)-320281).

However, the above processes for producing styrene copolymers having the syndiotactic configuration by copolymerization have the following drawbacks. (1) In the copolymerization with polar vinyl monomers, amorphous byproducts soluble in solvents are occasionally formed in great amounts or the crystalline property and heat resistance which are proper characteristics of the syndiotactic styrene resins are occasionally adversely affected. (2) It is desirable for improving physical properties that a functional group is uniformly distributed within a polymer. However, in a block copolymer of styrene and a styrenic polar comonomer, a monomer having the functional group is incorporated only into growing end portions of a polymer and, therefore, the effect of improving the physical properties is smaller than that of random copolymers in which the monomer units having a functional group are distributed randomly in the molecular chain. (3) When a polar vinyl monomer or a styrenic compound having a functional group is present in the polymerization system without any pretreatments, the activity of a catalyst and productivity markedly decrease due to the monomer or the compound.

DISCLOSURE OF THE INVENTION

Under the above circumstances, the present invention has an object of providing a process for efficiently producing a styrenic copolymer, in particular, a styrenic random copolymer, having a functional group and the syndiotactic configuration and exhibiting improved physical properties such as adhesion with adhesives and compatibility with various rubbers.

As the result of extensive studies by the present inventors to achieve the above object, it was found that, when a vinyl compound having a functional group was treated with a metal compound to mask the functional group and copolymerized with a styrenic compound in the presence of a specific catalyst, the decrease in the activity of the catalyst was suppressed and a styrenic copolymer, in particular, a random styrenic copolymer, having the functional group and the syndiotactic configuration could be efficiently obtained and that the styrenic random copolymer having specific repeating units, the functional group and the syndiotactic configuration was very useful for improving physical properties such as adhesion with adhesives and compatibility with various rubbers. The present invention has been completed based on the knowledge.

The present invention provides a process for producing a styrenic copolymer having a functional group and a syndiotactic configuration, the process comprising bringing a metal compound into interaction with a vinyl compound having a functional group to mask the functional group and copolymerizing the vinyl compound having the masked functional group with a styrenic compound in a presence of a polymerization catalyst comprising (A) a transition metal compound, (B) at least one compound selected from compounds having oxygen and compounds which can form ionic complex compounds by reaction with the transition metal compound and (C) an organometallic compound.

The present invention also provides a random styrenic copolymer having a functional group and a syndiotactic configuration, the copolymer comprising:

(a) styrenic repeating units represented by general formula (II):

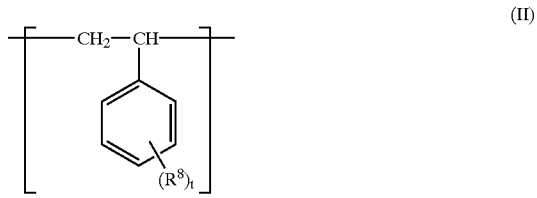

(II)

wherein $R^8$ represents hydrogen atom, a halogen atom or a substituent having C, Sn or Si, t represents an integer of 1 to 5 and, when a plurality of $R^8$ are present, the plurality of $R^8$ may represent a same group or different groups, and (b) repeating units which are derived from a vinyl compound having a functional group and represented by general formula (III):

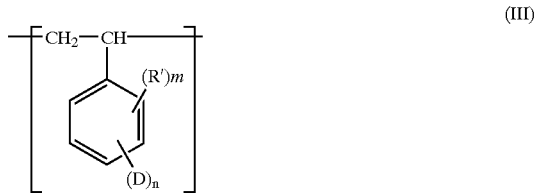

(III)

wherein D represents a substituent having $-OR^1$, $-COR^1$, $-CO_2R^1$, $-CN$, $-NR^1R^2$, $-SR^1$ or $-PR^1R^2$, $R^1$ and $R^2$ each representing hydrogen atom, an alkyl group having 1 to 20 carbon atoms, an aryl group having 6 to 20 carbon atoms or an alkylsilyl group having 3 to 20 carbon atoms; R' represents a linear or branched hydrocarbon group having 1 to 20 carbon atoms; when a plurality of D are present, the plurality of D may represent a same group or different groups; n represents an integer of 1 to 5; m represents an integer of 0 to 4; and $n+m \leq 5$, wherein the copolymer comprises 0.01 to 50% by mole of repeating unit (b) and a steric regularity of the copolymer comprising repeating unit (a) and repeating unit (b) is syndiotactic.

THE MOST PREFERRED EMBODIMENT TO CARRY OUT THE INVENTION

In accordance with the process of the present invention, a styrenic copolymer, in particular, a random styrenic copolymer, having a functional group and the syndiotactic configuration can be obtained. Block copolymers and graft copolymers can also be produced. Styrenic block copolymers can be produced, for example, by applying the process of the present invention to the two-step process described in Japanese Patent Application Laid-Open No. Heisei 5(1993)-320281. Block, random and alternating styrenic copolymers can be obtained by applying the process of the present invention to the process described in Japanese Patent Application Laid-Open No. Showa 63(1988)-241009.

As the raw material monomers in the process of the present invention, a vinyl compound having a functional group and a styrenic compound can be used.

Examples of the vinyl compound having a functional group include styrenic compounds having a functional group which are represented by general formula (I):

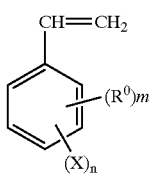

(I)

wherein X represents a functional group which can be masked with the metal compound; $R^0$ represents a hydrocarbon group; when a plurality of X are present, the plurality of X may represent the same group or different groups; when a plurality of $R^0$ are present, the plurality of $R^0$ may represent the same group or different groups; n represents an integer of 1 to 5; m represents an integer of 0 to 5; and $n+m \leq 5$.

Examples of the preferable styrenic compound having a functional group which is represented by general formula (I) include compounds represented by general formula (I) in which X represents a substituent having —$OR^1$, —$COR^1$, —$CO_2R^1$, —CN, —$NR^1R^2$, —$SR^1$ or —$PR^1R^2$ and $R^0$ represents a linear or branched hydrocarbon group having 1 to 20 carbon atoms.

$R^1$ and $R^2$ each represent hydrogen atom, an alkyl group having 1 to 20 carbon atoms, an aryl group having 6 to 20 carbon atoms or an alkylsilyl group having 3 to 20 carbon atoms. When the groups represented by $R^1$ and $R^2$ are present in the same substituent, the groups represented by $R^1$ and $R^2$ may be the same with or different from each other. As the group represented by $R^0$, linear or branched alkyl groups are preferable. Examples of the alkyl group represented by $R^0$ include methyl group, ethyl group, n-propyl group, isopropyl group, n-butyl group, isobutyl group, tert-butyl group, n-hexyl group and n-decyl group.

Specific examples of the above styrenic compound having a functional group include hydroxystyrenes such as o-hydroxystyrene, p-hydroxystyrene and m-hydroxystyrene; alkoxystyrenes and siloxystyrenes such as o-methoxystyrene, p-methoxystyrene, m-methoxystyrene, o-ethoxystyrene, p-ethoxystyrene, m-ethoxystyrene, 4-methoxy-3-methylstyrene, p-propoxystyrene, p-phenoxystyrene, p-t-butoxystyrene, p-trityloxystyrene, p-trimethylsiloxystyrene, p-t-butyldimethylsiloxystyrene, p-triisopropylsiloxystyrene and p-acetoxystyrene; ether styrenes such as p-vinylbenzyl methyl ether, p-vinylbenzyl ethyl ether, p-vinylbenzyl n-propyl ether, p-vinylbenzyl isopropyl ether, p-vinylbenzyl n-butyl ether, p-vinylbenzyl t-butyl ether, 1-(4-vinylphenyl)-1,1-dimethylmethyl methyl ether, 1-(4-vinylphenyl)-1,1-dimethylmethyl ethyl ether, (1-(4-vinylphenyl)-1,1-dimethylmethyl propyl ether, 1-(4-vinylphenyl)-1,1-dimethylmethyl butyl ether, 1-(4-vinylphenyl)-1,1-diphenylmethyl methyl ether, 1-(4-vinylphenyl)-1,1-diphenylmethyl ethyl ether, 1-(4-vinylphenyl)-1,1-diphenylmethyl butyl ether, 1-(4-vinylphenyl)-1,1-dimethylmethyl trimethylsilyl ether and 1-(4-vinylphenyl)-1,1-dimethylmethyl triethylsilyl ether; alcohols such as p-vinylbenzyl alcohol, (4-vinylphenyl)-1,1-dimethylmethanol, (4-vinylphenyl)-1,1-diphenylmethanol and 2-(4-vinylphenyl)ethanol; amines such as 2-aminostyrene, 3-aminostyrene, 4-aminostyrene, 3,4-diaminostyrene, 4-vinylbenzylamine and 2-(4-vinylphenyl) ethylamine; aminostyrenes substituted with alkyl groups such as m-N,N-dimethylaminostyrene, p-N,N-dimethylaminostyrene, p-vinylbenzyl-N,N-dimethylamine, p-vinylbenzyl-N,N-diethylamine, p-vinylbenzyl-N,N-di-n-propylamine, p-vinylbenzyl-N,N-di-n-butylamine, p-(N,N-dimethylamino)styrene, p-(N,N-diethylamino)styrene, p-(N, N-di-n-propylamino)styrene, p-(N,N-di-n-butylamino) styrene, N-(p-vinylbenzyl)-pyrrolidine, N-(p-vinylbenzyl) piperidine and N-(p-vinylbenzyl)morpholine; styrenes having carbonyl group such as p-vinylbenzoic acid, methyl p-vinylbenzoate, phenyl p-vinylbenzoate, methyl 3-vinylsalicylate, p-formylstyrene, p-acetylstyrene and p-vinylbenzophenone; cyanostyrenes such as o-cyanostyrene, m-cyanostyrene and p-cyanostyrene; mercaptostyrenes and alkylthiostyrenes such as o-mercaptostyrene, m-mercaptostyrene, p-mercaptostyrene, o-methylthiostyrene, m-methyl-thiostyrene, p-methylthiostyrene, o-ethylthiostyrene, m-ethylthiostyrene and p-ethylthiostyrene; p-styryldiphenylphosphine; 3,5-dimethyl-4-hydroxystyrene; 3,5-diethyl-4-hydroxystyrene; 3,5-dipropyl-4-hydroxystyrene; 3,5-diisopropyl-4-hydroxystyrene; 3,5-di-tert-butyl-4-hydroxystyrene; 3,5-di-tert-butyl-4-aminostyrene and 3,5-di-tert-butyl-carboxystyrene.

Further examples of the preferable styrenic compound having a functional group include compounds represented by general formula (I) in which X represents a group represented by —$(CR^3R^4)_p$—D or —$Z(QR^5R^6R^7)_q$.

In the group represented by —$(CR^3R^4)_p$—D, D represents a substituent having —$OR^1$, —$COR^1$, —$CO_2R^1$, —CN, —$NR^1R^2$, —$SR^1$ or —$PR^1R^2$; $R^3$ and $R^4$ each represent an alkyl group having 1 to 20 carbon atoms, an aryl group having 6 to 20 carbon atoms or an alkylsilyl group having 3 to 20 carbon atoms; $R^1$ and $R^2$ are as defined above; p represents an integer of 1 to 10; when a plurality of —$CR^3R^4$ are present, the plurality of —$CR^3R^4$ may represent the same group or different groups; and $R^3$ and $R^4$ may represent the same group or different groups.

In the group represented by —$Z(QR^5R^6R^7)_q$, Z represents O, N or S; Q represents C, Si or Sn; $R^5$ to $R^7$ each represent an alkyl group having 1 to 20 carbon atoms, an aryl group having 6 to 20 carbon atoms or an alkylsilyl group having 3 to 20 carbon atoms; q represents 1 or 2; when q represents 2, the two $QR^5R^6R^7$ may represent the same group or different groups; and $R^5$ to $R^7$ may represent the same group or different groups.

Specific examples of the above styrenic compound having a functional group include ether styrenes such as 1-(4-vinylphenyl)-1,1-dimethylmethyl methyl ether, 1-(4-vinylphenyl)-1,1-dimethylmethyl ethyl ether, 1-(4-vinylphenyl)-1,1-dimethylmethyl butyl ether, 1-(4-vinylphenyl)-1,1-diphenylmethyl methyl ether, 1-(4-vinylphenyl)-1,1-diphenylmethyl ethyl ether, 1-(4-vinylphenyl)-1,1-diphenylmethyl butyl ether, 1-(4-vinylphenyl)-1,1-dimethylmethyl trimethylsilyl ether and 1-(4-vinylphenyl)-1,1-dimethylmethyl triethylsilyl ether; alcohols such as 4-(vinylphenyl)-1,1-dimethylmethanol and 4-(vinylphenyl)-1,1-diphenylmethanol; and other ether styrenes such as p-t-butoxystyrene, p-trityloxystyrene, p-trimethylsiloxystyrene, p-t-butyldimethylsiloxystyrene and p-triisopropylsiloxystyrene.

In the present invention, the styrenic compound having a functional group may be used singly or in combination of two or more.

In the process of the present invention, examples of the styrenic compound which is copolymerized with the above styrenic compound having a functional group include compounds represented by general formula (IV):

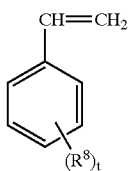

(IV)

wherein $R^8$ represents hydrogen atom, a halogen atom or a substituent having C, Sn or Si, t represents an integer of 1 to 5 and, when a plurality of $R^8$ are present, the plurality of $R^8$ may represent the same group or different groups.

Examples of the styrenic compound represented by general formula (IV) include styrene; alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene and p-t-butylstyrene; polyvinylbenzenes such as p-divinylbenzene, m-divinylbenzene and trivinylbenzene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; m-phenylstyrene; and p-phenylstyrene. The styrenic compound may be used singly or in combination of two or more.

In the process of the present invention, the relative amounts of the above styrenic compound having a functional group and the styrenic compound represented by general formula (IV) are not particularly limited. In general, the ratio of the amounts in mole of the styrenic compound having a functional group to the styrenic compound represented by general formula (IV) is selected in the range of 0.01:99.99 to 50:50, preferably in the range of 0.5:99.5 to 30:70 and more preferably in the range of 1:99 to 20:80.

In the process of the present invention, a metal compound is brought into interaction with the above vinyl compound having a functional group to mask the functional group. Examples of the metal compound include compounds represented by general formula (V):

$$M(A)_r \qquad (V)$$

wherein M represents a metal selected from metals of Groups 1 to 8 and Groups 11 to 14 of the Periodic Table, A represents hydrogen atom, a halogen atom, an alkyl group having 1 to 20 carbon atoms, an aryl group having 6 to 20 carbon atoms, an alkoxyl group having 1 to 20 carbon atoms or an aryloxyl group having 6 to 20 carbon atoms, r represents the valence of the metal represented by M and, when a plurality of A are present, the plurality of A may represent the same group or different groups.

Specific examples of the metal represented by M in general formula (V) include Li, Na, K, Be, Mg, Ca, Sr, Ba, Sc, Y, La, Ti, Zr, Hf, V, Nb, Ta, Cr, Mo, Mn, Fe, Ru, Cu, Zn, Cd, Hg, Al, Ga, Sn and Pb. Among these metals, Li, Na, K, Mg, Ti, Zr, Hf, Cu, Zn, Cd, Hg, Al, Ga, Sn and Pb are preferable and Al is more preferable.

As the metal compound, aluminum compounds having alkyl groups are preferable and trialkylaluminum and dialkylaluminum compounds are more preferable. Examples of the aluminum compound having alkyl groups include trialkyluminums such as trimethylaluminum, triethylaluminum, tri-n-propylaluminum, triisopropylaluminum, tri-n-butylaluminum, triisobutylaluminum and tri-t-butylaluminum; dialkylaluminum halides such as dimethylaluminum chloride, diethylaluminum chloride, di-n-propylaluminum chloride, diisopropylaluminum chloride, di-n-butylaluminum chloride, diisobutylaluminum chloride and di-t-butylaluminum chloride; dialkylaluminum alkoxides such as dimethylaluminum methoxide and dimethylaluminum ethoxide; and dialkylaluminum hydrides such as dimethylaluminum hydride, diethylaluminum hydride and diisobutylaluminum hydride.

In the present invention, the metal compound may be used singly or in combination of two or more.

In the process of the present invention, a polymerization catalyst comprising (A) a transition metal compound, (B) at least one compound selected from compounds having oxygen and compounds which can form ionic complex compounds by reaction with the transition metal compound and (C) an organometallic compound is used.

The above components of the catalyst will be described in the following.

(A) Transition Metal Compound

As the transition metal compound used in the present invention, various compounds can be used. Compounds of transition metals of Groups 4 to 6 and Groups 8 to 10 of the Periodic Table are preferably used. Examples of the compounds of transition metals of Groups 4 to 6 of the Periodic Table include compounds represented by general formulae (VI) to (IX) shown in the following. Examples of the compounds of transition metals of Groups 8 to 10 of the Periodic Table include compounds represented by general formula (X) also shown in the following.

$$Q^1{}_a(C_5H_{5-a-b}R^9{}_b)(C_5H_{5-a-c}R^{10}{}_c)M^1X^1Y^1 \qquad (VI)$$

$$Q^2{}_a(C_5H_{5-a-d}R^{11}{}_d) Z^1M^1X^1Y^1 \qquad (VII)$$

$$(C_5H_{5-e}R^{12}{}_e) M^1X^1Y^1W^1 \qquad (VIII)$$

$$M^1X^1Y^1W^1U^1 \qquad (IX)$$

$$L^1L^2M^2X^1Y^1 \qquad (X)$$

In the above formulae, $Q^1$ represents a bonding group connecting two conjugated five-membered ligands which are represented by $(C_5H_{5-a-b}R^9{}_b)$ and $(C_5H_{5-a-c}R^{10}{}_c)$; $Q^2$ represents a bonding group connecting a conjugated five-membered ligand represented by $(C_5H_{5-a-d}R^{11}_d)$ and a group represented by $Z^1$; $R^9$, $R^{10}$, $R^{11}$ and $R^{12}$ each represent a hydrocarbon group, a halogen atom, an alkoxyl group, a hydrocarbon group having silicon atom, a hydrocarbon group having phosphorus atom, a hydrocarbon group having nitrogen atom or a hydrocarbon group having boron atom; when a plurality of groups represented by any of $R^9$, $R^{10}$, $R^{11}$ and $R^{12}$ are present, the plurality of groups may be the same with or different from each other and may be bonded to each other to form a cyclic structure; a represents 0, 1 or 2; b, c and d each represent an integer of 0 to 5 when a=0, an integer of 0 to 4 when a=1 and an integer of 0 to 3 when a=2; e represents an integer of 0 to 5; $M^1$ represents a transition metal selected from metals of Groups 4 to 6 of the Periodic Table; $M^2$ represents a transition metal selected from metals of Groups 8 to 10 of the Periodic Table; $L^1$ and $L^2$ each represent a ligand forming a coordinating bond; $X^1$, $Y^1$, $Z^1$, $W^1$ and $U^1$ each represent a ligand forming a covalent bond or an ionic bond; and the ligands represented by $L^1$, $L^2$, $X^1$, $Y^1$, $W^1$ and $U^1$ may be bonded to each other to form a cyclic structure.

Examples of the groups represented by $Q^1$ and $Q^2$ in the above general formulae (VI) and (VII) include (1) alkylene groups having 1 to 4 carbon atoms, cycloalkylene groups and these groups substituted with lower alkyl groups as side chain groups or phenyl group such as methylene group, ethylene group, isopropylene group, methylphenylmethylene group, diphenylmethylene group and cyclohexylene group; (2) silylene groups, oligosilylene groups and these groups substituted with lower alkyl groups as side chain groups or phenyl group such as silylene group, dimethylsilylene group, methylphenylsilylene group, diphenylsilylene group, disilylene group and tetramethyldisilylene group; (3) hydrocarbon groups, such as lower alkyl groups, phenyl group and hydrocarbyloxy groups which are preferably lower alkoxyl groups, having germanium atom, phosphorus atom, nitrogen atom, boron atom or aluminum atom such as $(CH_3)_2Ge$ group, $(C_6H_5)_2Ge$ group, $(CH_3)P$ group, $(C_6H_5)P$ group, $(C_4H_9)N$ group, $(C_6H_5)N$ group, $(CH_3)B$ group, $(C_4H_9)B$ group, $(C_6H_5)B$ group, $(C_6H_5)Al$ group and $(CH_3O)Al$ group. Among these groups, alkylene groups and silylene groups are preferable.

$(C_5H_{5-a-b}R^9_b)$, $(C_5H_{5-a-c}R^{10}_c)$ and $(C_5H_{5-a-d}R^{11}_d)$ each represent a conjugated five-membered ligand. In these formulae, $R^9$, $R^{10}$ and $R^{11}$ each represent a hydrocarbon group, a halogen atom, an alkoxyl group, a hydrocarbon group having silicon atom, a hydrocarbon group having phosphorus atom, a hydrocarbon group having nitrogen atom or a hydrocarbon group having boron atom; and a represents 0, 1 or 2; and b, c and d each represent an integer of 0 to 5 when a=0, an integer of 0 to 4 when a=1 and an integer of 0 to 3 when a=2. As the hydrocarbon group, hydrocarbon groups having 1 to 20 carbon atoms are preferable and hydrocarbon groups having 1 to 12 carbon atoms are more preferable. The hydrocarbon group may be a monovalent group bonded to cyclopentadienyl group which is a conjugated five-membered group. When a plurality of hydrocarbon groups are present, two of the plurality of hydrocarbon groups may be bonded to each other to form a cyclic structure in combination with a portion of cyclopentadienyl group. Examples of the conjugated five-membered ring include substituted or unsubstituted cyclopentadienyl group, indenyl group and fluorenyl group. Examples of the halogen atom include chlorine atom, bromine atom, iodine atom and fluorine atom. As the alkoxyl group, alkoxyl groups having 1 to 12 carbon atoms are preferable. Examples of the hydrocarbon group having silicon include groups represented by $-Si(R^{13})(R^{14})(R^{15})$, wherein $R^{13}$, $R^{14}$ and $R^{15}$ each represent a hydrocarbon group having 1 to 24 carbon atoms. Examples of the hydrocarbon group having phosphorus atom, the hydrocarbon group having nitrogen atom and the hydrocarbon group having boron atom include groups represented by $-P(R^{16})(R^{17})$, $-N(R^{16})(R^{17})$ and $-B(R^{16})(R^{17})$, respectively, wherein $R^{16}$ and $R^{17}$ each represent a hydrocarbon group having 1 to 18 carbon atoms. When a plurality of groups represented by any of $R^9$, $R^{10}$ and $R^{11}$ are present, the plurality of $R^9$, $R^{10}$ or $R^{11}$ may represent the same group or different groups. In general formula (VI), the conjugated five-membered ligands represented by $(C_5H_{5-a-b}R^9_b)$ and $(C_5H_{5-a-c}R^{10}_c)$ may be the same with or different from each other.

$M^1$ represents a transition metal element of any of Groups 4 to 6 of the Periodic Table. Examples of the transition metal element include titanium, zirconium, hafnium, niobium, molybdenum and tungsten. Among these elements, titanium, zirconium and hafnium are preferable and titanium is more preferable. $Z^1$ represents a ligand forming a covalent bond. Specifically, $Z^1$ represents oxygen ($-O-$), sulfur ($-S-$), an alkoxyl group having 1 to 20 carbon atoms and preferably 1 to 10 carbon atoms, a thioalkoxyl group having 1 to 20 carbon atoms and preferably 1 to 12 carbon atoms, a hydrocarbon group having nitrogen atom and 1 to 40 carbon atoms and preferably 1 to 18 carbon atoms or a hydrocarbon group having phosphorus atom and 1 to 40 carbon atoms and preferably 1 to 18 carbon atoms. $X^1$ and $Y^1$ each represent a ligand forming a covalent bond Specifically, $X^1$ and $Y^1$ each represent hydrogen atom, a halogen atom, a hydrocarbon atom having 1 to 20 carbon atoms and preferably 1 to 10 carbon atoms, an alkoxyl group having 1 to 20 carbon atoms and preferably 1 to 10 carbon atoms, amino group, a hydrocarbon group having phosphorus atom and 1 to 20 carbon atoms and preferably 1 to 12 carbon atoms such as diphenylphosphine group, a hydrocarbon group having silicon and 1 to 20 carbon atoms and preferably 1 to 12 carbon atoms such as trimethylsilyl group or a boron compound having hydrocarbon groups having 1 to 20 carbon atoms and preferably 1 to 12 carbon atoms or halogen atoms such as $B(C_6H_5)_4$ and $BF_4$. Among the above ligands, halogen atoms and hydrocarbon groups are preferable. The ligands represented $X^1$ and $Y^1$ may be the same with or different from each other. The ligands represented by $X^1$ and $Y^1$ may be bonded to each other to form a cyclic structure.

In the above general formula (VIII), $M^1$ represents a transition metal selected from metals of Groups 4 to 6 of the Periodic Table as described above and $X^1$ and $Y^1$ are as defined above. $W^1$ represents the same ligand as that represented by $X^1$ or $Y^1$. In other words, $W^1$ represents a ligand forming a covalent bond. Specifically, $W^1$ represents hydrogen atom, a halogen atom, a hydrocarbon atom having 1 to 20 carbon atoms and preferably 1 to 10 carbon atoms, an alkoxyl group having 1 to 20 carbon atoms and preferably 1 to 10 carbon atoms, amino group, a hydrocarbon group having phosphorus atom and 1 to 20 carbon atoms and preferably 1 to 12 carbon atoms such as diphenylphosphine group, a hydrocarbon group having silicon and 1 to 20 carbon atoms and preferably 1 to 12 carbon atoms such as trimethylsilyl group or a boron compound having hydrocarbon groups having 1 to 20 carbon atoms and preferably 1 to 12 carbon atoms or halogen atoms such as $B(C_6H_5)_4$ and $BF_4$. Among the above ligands, halogen atoms and hydrocarbon groups are preferable. The ligands represented $X^1$, $Y^1$ and $W^1$ may be the same with or different from each other. The ligands represented by $X^1$, $Y^1$ and $W^1$ may be bonded to each other to form a cyclic structure.

In the above general formula (IX), $M^1$ represents a transition metal selected from metals of Groups 4 to 6 of the Periodic Table as described above and $X^1$, $Y^1$ and $W^1$ are as defined above. $U^1$ represents the same ligand as that represented by $X^1$ $Y^1$ or $W^1$. In other words, $U^1$ represents a ligand forming a covalent bond. Specifically, $U^1$ represents hydrogen atom, a halogen atom, a hydrocarbon atom having 1 to 20 carbon atoms and preferably 1 to 10 carbon atoms, an alkoxyl group having 1 to 20 carbon atoms and preferably 1 to 10 carbon atoms, amino group, a hydrocarbon group having phosphorus atom and 1 to 20 carbon atoms and preferably 1 to 12 carbon atoms such as diphenylphosphine group, a hydrocarbon group having silicon and 1 to 20 carbon atoms and preferably 1 to 12 carbon atoms such as trimethylsilyl group or a boron compound having hydrocarbon groups having 1 to 20 carbon atoms and preferably 1 to 12 carbon atoms or halogen atoms such as $B(C_6H_5)_4$ and $BF_4$. Among the above ligands, halogen atoms and hydrocarbon groups are preferable. The ligands represented $X^1$, $Y^1$, $W^1$ and $U^1$ may be the same with or different from each other. The ligands represented by $X^1$, $Y^1$, $W^1$ and $U^1$ may be bonded to each other to form a cyclic structure.

(a) Examples of the transition metal compounds represented by general formulae (VI) and (VII) include the following compounds.

① Transition metal compounds having two conjugated five-membered cyclic ligands and no groups connecting the two ligands such as bis(cyclopentadienyl) titanium dichloride, bis(methylcyclopentadienyl) titanium dichloride, bis(dimethylcyclopentadienyl) titanium dichloride, bis(trimethylcyclopentadienyl) titanium dichloride, bis(tetramethylcyclopentadienyl) titanium dichloride, bis(pentamethylcyclopentadienyl) titanium dichloride, bis(n-butylcyclopentadienyl) titanium dichloride, bis(indenyl)titanium dichloride, bis(fluorenyl)titanium dichloride, bis(cyclopentadienyl)titanium chlorohydride, bis(cyclopentadienyl)methyltitanium chloride, bis(cyclopentadienyl)ethyltitanium chloride, bis(cyclopentadienyl)phenyltitanium chloride, bis(cyclopentadienyl)dimethyltitanium, bis(cyclopentadienyl)diphenyltitanium, bis(cyclopentadienyl)dineopentyltitanium, bis(cyclopentadienyl)dihydrotitanium, (cyclopentadienyl)(indenyl)titanium dichloride and (cyclopentadienyl)(fluorenyl)titanium dichloride.

② Transition metal compounds having two conjugated five-membered cyclic ligands connected with an alkylene group such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl)titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4-dimethylindenyl)titanium dichloride, ethylenebis(2-methyl-4-trimethylsilylindenyl)titanium dichloride, ethylenebis(2,4-dimethyl-5,6,7-trihydroindenyl) titanium dichloride, ethylene(2,4-dimethylcyclopentadienyl)(3',5'-dimethylcyclopentadienyl)titanium dichloride, ethylene(2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl) titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, methylene(cyclopentadienyl)(3,4-dimethylcyclopentadienyl)titanium dichloride, methylene(cyclopentadienyl)(3,4-dimethylcyclopentadienyl)titanium chlorohydride, methylene(cyclopentadienyl)(3,4-dimethylcyclopentadienyl)dimethyltitanium, methylene(cyclopentadienyl)(3,4-dimethylcyclopentadienyl)diphenyltitanium, methylene(cyclopentadienyl)(trimethylcyclopentadienyl)titanium dichloride, methylene (cyclopentadienyl)(tetramethylcyclopentadienyl) titanium dichloride, isopropylidene(cyclopentadienyl)(3,4-dimethylcyclopentadienyl)titanium dichloride, isopropylidene(cyclopentadienyl)-(2,3,4,5-tetramethylcyclopentadienyl)titanium dichloride, isopropylidene(cyclopentadienyl)(3-methylindenyl) titanium dichloride, isopropylidene(cyclopentadienyl)(fluorenyl)titanium dichloride, isopropylidene(2-methylcyclopentadienyl)(fluorenyl)titanium dichloride, isopropylidene(2,5-dimethylcyclopentadienyl)(3,4-dimethylcyclopentadienyl)titanium dichloride, isopropylidene(2,5-dimethylcyclopentadienyl)(fluorenyl)titanium dichloride, ethylene(cyclopentadienyl)(3,5-dimethylcyclopentadienyl) titanium dichloride, ethylene(cyclopentadienyl)(fluorenyl)titanium dichloride, ethylene(2,5-dimethylcyclopentadienyl)(fluorenyl)titanium dichloride, ethylene(2,5-diethylcyclopentadienyl)(fluorenyl)titanium dichloride, diphenylmethylene (cyclopentadienyl)(3,4-diethylcyclopentadienyl) titanium dichloride, diphenylmethylene (cyclopentadienyl)(3,4-diethylcyclopentadienyl) titanium dichloride, cyclohexylidene (cyclopentadienyl)(fluorenyl)titanium dichloride and cyclohexylidene (2,5-dimethylcyclopentadienyl)(3',4'-dimethylcyclopentadienyl)titanium dichloride.

③ Transition metal compounds having two conjugated five-membered cyclic ligands connected with a silylene group such as dimethylsilylenebis(indenyl)titanium dichloride, dimethylsilylenebis(4,5,6,7-tetrahydroindenyl)titanium dichloride, dimethylsilylenebis(2-methylindenyl)titanium dichloride, dimethylsilylenebis(2,4-dimethylindenyl) titanium dichloride, dimethylsilylenebis(2,4-dimethylcyclopentadienyl)(3',5'-dimethylcyclopentadienyl)titanium dichloride, phenylmethylsilylenebis(indenyl)titanium dichloride, phenylmethylsilylenebis(4,5,6,7-tetrahydroindenyl) titanium dichloride, phenylmethylsilylenebis(2,4-dimethylindenyl)titanium dichloride, phenylmethylsilylene(2,4-dimethylcyclopentadienyl) (3',5'-dimethylcyclopentadienyl)titanium dichloride, phenylmethylsilylene(2,3,5-trimethylcyclopentadienyl)(2',4',5'-trimethylcyclopentadienyl)titanium dichloride, phenylmethylsilylenebis(tetramethylcyclopentadienyl) titanium dichloride, diphenylsilylenebis(2,4-dimethylindenyl)titanium dichloride, diphenylsilylenebis(indenyl)titanium dichloride, diphenylsilylenebis(2-methylindenyl)titanium dichloride, tetramethyldisilylenebis(indenyl)titanium dichloride, tetramethyldisilylenebis(cyclopentadienyl) titanium dichloride, tetramethyldisilylene(3-methylcyclopentadienyl)(indenyl)titanium dichloride, dimethylsilylene(cyclopentadienyl)(3,4-dimethylcyclopentadienyl)titanium dichloride, dimethylsilylene(cyclopentadienyl)(trimethylcyclopentadienyl)titanium dichloride, dimethylsilylene(cyclopentadienyl)(tetramethylcyclopentadienyl)titanium dichloride, dimethylsilylene(cyclopentadienyl)(3,4-diethylcyclopentadienyl)titanium dichloride, dimethylsilylene(cyclopentadienyl)(triethylcyclopentadienyl)titanium dichloride, dimethylsilylene(cyclopentadienyl)(tetraethylcyclopentadienyl)titanium dichloride, dimethylsilylene(cyclopentadienyl)(fluorenyl)titanium dichloride, dimethylsilylene(cyclopentadienyl)(2,7-di-t-butylfluorenyl)titanium dichloride, dimethylsilylene(cyclopentadienyl)(octahydrofluorenyl)titanium dichloride, dimethylsilylene(2-methylcyclopentadienyl)(fluorenyl)titanium dichloride, dimethylsilylene(2,5-dimethylcyclopentadienyl)(fluorenyl)titanium dichloride, dimethylsilylene(2-ethylcyclopentadienyl)(fluorenyl)titanium dichloride, dimethylsilylene(2,5-diethylcyclopentadienyl)(fluorenyl)titanium dichloride, diethylsilylene(2-methylcyclopentadienyl)(2',7'-di-t-butylfluorenyl)titanium dichloride, dimethylsilylene(2,5-dimethylcyclopentadienyl)(2',7'-di-t-butylfluorenyl)titanium dichloride, dimethylsilylene(2-ethylcyclopentadienyl)(2',7'-di-t-butylfluorenyl)titanium dichloride, dimethylsilylene(diethylcyclopentadienyl)(2,7-di-t-butylfluorenyl)titanium dichloride, dimethylsilylene(methylcyclopentadienyl)(octahydrofluorenyl)titanium dichloride, dimethylsilylene(dimethylcyclopentadienyl)(octahydrofluorenyl)titanium dichloride, dimethylsilylene(ethylcyclopentadienyl)(octahydrofluorenyl)titanium dichloride and dimethylsilylene(diethylcyclopentadienyl)(octahydrofluorenyl)titanium dichloride.

④ Transition metal compounds having two conjugated five-membered cyclic ligands connected with a hydrocarbon group having germanium atom, aluminum atom, boron atom, phosphorus atom or nitrogen atom such as dimethylgermylenebis(indenyl)titanium dichloride, dimethylgermylene(cyclopentadienyl)(fluorenyl)titanium dichloride, methylalumylenebis(indenyl)titanium dichloride, phenylalumylenebis(indenyl)titanium dichloride, phenylphosphylenebis(indenyl)titanium dichloride, ethylborenebis(indenyl)titanium dichloride, phenylalumylene-bis(indenyl)titanium dichloride and phenylalumylene(cyclopentadienyl)(fluorenyl)titanium dichloride.

⑤ Transition metal compounds having one conjugated five-membered cyclic ligand such as pentamethylcyclopentadienylbis(phenyl)aminotitanium dichloride, indenylbis(phenyl)aminotitanium dichloride, pentamethylcyclopentadienylbis(trimethylsilyl)aminotitanium dichloride, pentamethylcyclopentadienylphenoxytitanium dichloride, dimethylsilylene(tetramethylcyclopentadienyl)phenylaminotitanium dichloride, dimethylsilylene(tetramethylcyclopenetadienyl)-t-butylaminotitanium dichloride, dimethylsilylene(tetrahydroindenyl)decylaminotitanium dichloride, dimethylsilylene(tetrahydroindenyl)[bis(trimethylsilyl)amino]titanium dichloride, dimethylgermylene(tetramethylcyclopentadienyl)phenylaminotitanium dichloride, pentamethylcyclopentadienyltitanium trimethoxide, pentamethylcyclopentadienyltitanium trichloride, (tertiary-butylamido)(tetramethyl-η5-cyclopentadienyl)-1,2-ethandiyltitanium dichloride, (methylamido)(tetramethyl-η5-cyclopentadienyl)-1,2-ethandiyltitanium dichloride, (ethylamido)(tetramethyl-η5-cyclopentadienyl)methylenetitanium dichloride, (tertiary-butylamido)dimethyl(tetramethyl-η5-cyclopentadienyl)silanetitanium dichloride, (benzylamido)dimethyl(tetramethyl-η5-cyclopentadienyl)silanetitanium dichloride and (phenylphosphido)dimethyl(tetramethyl-η5-cyclopentadienyl)silanetitanium dibenzyl.

⑥ Transition metal compounds having two doubly connected conjugated five-membered cyclic ligands such as (1,1'-dimethylsilylene)(2,2'-isopropylidene)bis(cyclopentadienyl)titanium dichloride, (1,1'-dimethylsilylene)(2,2'-dimethylsilylene)bis(cyclopentadienyl)titanium dichloride, (1,1'-dimethylsilylene)(2,2'-isopropylidene)bis(cyclopentadienyl)dimethyltitanium, (1,1'-dimethylsilylene)(2,2'-isopropylidene)bis(cyclopentadienyl)dibenzyltitanium, (1,1'-dimethylsilylene)(2,2'-isopropylidene)bis(cyclopentadienyl)bis(trimethylsilyl)titanium, (1,1'-dimethylsilylene)(2,2'-isopropylidene)bis(cyclopentadienyl)bis(trimethylsilylmethyl)titanium, (1,2'-dimethylsilylene)(2,1'-ethylene)bis(indenyl)titanium dichloride, (1,1'-dimethylsilylene)(2,2'-ethylene)bis(indenyl)titanium dichloride, (1,1'-ethylene) (2,2'-dimethylsilylene)bis(indenyl)titanium dichloride and (1,1'-dimethylsilylene)(2,2'-cyclohexylidene)bis(indenyl)titanium dichloride.

⑦ Compounds obtained by replacing chlorine atom in the above compounds ① to ⑥ with bromine atom, iodine atom, hydrogen atom, methyl group or phenyl group; and compounds obtained by replacing titanium as the central metal of the above transition metal compounds with zirconium, hafnium, niobium, molybdenum or tungsten.

⑧ Among compounds ① to ⑦ described above, compounds ⑤ which are the transition metal compounds having one conjugated five-membered cyclic ligand are preferably used for producing the styrenic copolymers having the syndiotactic configuration.

(b) Examples of the transition metal compounds represented by the above general formula (VIII) will be described in the following.

Among the transition metal compounds represented by general formula (VIII), compounds represented by general formula (VIII) in which $(C_5H_{5-e}R^{12}_e)$ represents a group selected from the groups represented by the following general formulae (XI) to (XVII) are preferable.

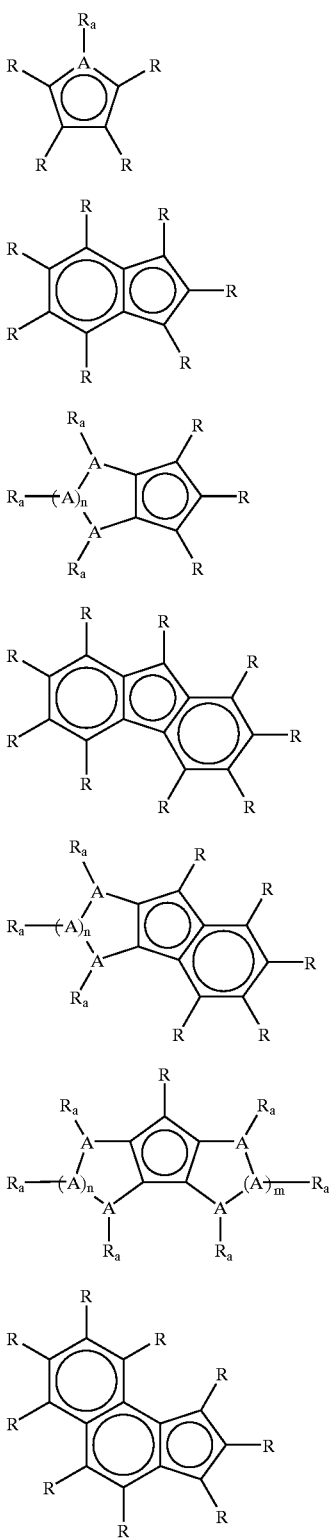

(XI)

(XII)

(XIII)

(XIV)

(XV)

(XVI)

(XVII)

In the above formulae, A represents an element of any of Groups 13, 14, 15 and 16 and, when a plurality of A are present, the plurality of A may represent the same group or different groups. R represents hydrogen atom, a halogen atoms, an aliphatic hydrocarbon group having 1 to 30 carbon atoms, an aromatic hydrocarbon groups having 6 to 30 carbon atoms, an alkoxyl group having 1 to 30 carbon atoms, an aryloxyl group having 6 to 30 carbon atoms, a thioalkoxyl group having 1 to 30 carbon atoms, a thioaryloxyl group having 6 to 30 carbon atoms, amino group, amido group, carboxyl group, an alkylsilyl group having 3 to 30 carbon atoms or an alkylsilylalkyl group. The plurality of R may represent the same atom or group or different atoms and groups and may be bonded to each other to form a cyclic structure. a represents 0, 1 or 2 and n and m each represent an integer of 1 or greater.

Specific examples of the group represented by $(C_5H_{5-e}R^{12}_e)$ include the following groups.

For indenyl derivatives and fluorenyl derivatives, the positions of substituents are shown by the numbers shown in the following:

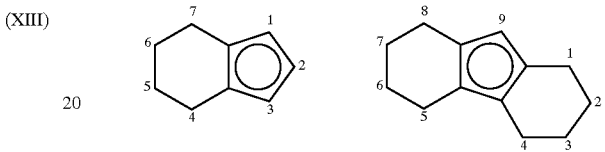

Cyclopentadienyl group, methylcyclopentadienyl group, 1,2-dimethylcyclopentadienyl group, 1,3-dimethylcyclopentadienyl group, 1,2,3-trimethylcyclopentadienyl group, 1,3,4-trimethylcyclopentadienyl group, tetramethylcyclopentadienyl group, pentamethylcyclopentadienyl group, ethylcyclopentadienyl group, 1,2-diethylcyclopentadienyl group, 1,3-diethylcyclopentadienyl group, 1,2,3-triethylcyclopentadienyl group, 1,3,4-triethylcyclopentadienyl group, tetraethylcyclopentadienyl group, pentaethylcyclopentadienyl group, indenyl group, 1-methylindenyl group, 1,2-dimethylindenyl group, 1,3-dimethylindenyl group, 1,2,3-trimethylindenyl group, 2-methylindenyl group, 1-ethylindeny group, 1-ethyl-2-methylindenyl group, 1-ethyl-3-methylindenyl group, 1-ethyl-2,3-dimethylindenyl group, 1,2-diethylindenyl group, 1,3-diethylindenyl group, 1,2,3-triethylindenyl group, 2-ethylindenyl group, 1-methyl-2-ethylindenyl group, 1,3-dimethyl-2-ethylindenyl group, 4,5,6-7-tetrahydroindenyl group, 1-methyl-4,5,6,7-tetrahydroindenyl group, 1,2-dimethyl-4,5,6,7-tetrahydroindenyl group, 1,3-dimethyl-4,5,6,7-tetrahydroindenyl group, 1,2,3-trimethyl-4,5,6,7-tetrahydroindenyl group, 2-methyl-4,5,6,7-tetrahydroindenyl group, 1-ethyl-4,5,6,7-tetrahydroindenyl group, 1-ethyl-2-methyl-4,5,6,7-tetrahydroindenyl group, 1-ethyl-3-methyl-4,5,6,7-tetrahydroindenyl group, 1-ethyl-2,3-dimethyl-4,5,6,7-tetrahydroindenyl group, 1,2-diethyl-4,5,6,7-tetrahydroindenyl group, 1,2-diethyl-3-methyl-4,5,6,7-tetrahydroindenyl group, 1,3-diethyl-4,5,6,7-tetrahydroindenyl group, 1,3-diethyl-2-methyl-4,5,6,7-tetrahydroindenyl group, 1,2,3-triethyl-4,5,6,7-tetrahydroindenyl group, 2-ethyl-4,5,6,7-tetrahydroindenyl group, 1-methyl-2-ethyl-4,5,6,7-tetrahydroindenyl group, 1,3-dimethyl-2-ethyl-4,5,6,7-tetrahydroindenyl group, fluorenyl group, 9-methylfluorenyl group, 9-ethylfluorenyl group, 1,2,3,4-tetrahydrofluorenyl group, 9-methyl-1,2,3,4-tetrahydrofluorenyl group, 9-ethyl-1,2,3,4-tetrahydrofluorenyl group, 1,2,3,4,5,6,7,8-octahydrofluorenyl group, 9-methyl-1,2,3,4,5,6,7,8-octahydrofluorenyl group and 9-ethyl-1,2,3,4,5,6,7,8-octahydrofluorenyl group.

Examples of the compound represented by general formula (VIII) include the following compounds: cyclopentadienyl titanium trichloride, cyclopentadienyltitanium trimethyl, cyclopentadienyltitanium trimethoxide, cyclopentadienyltitanium tribenzyl, methylcyclopentadienyltitanium trichloride, methylcyclopentadienyltitanium trimethyl, methylcyclopentadienyltitanium trimethoxide, methylcyclopentadienyltitanium tribenzyl, dimethylcyclopentadienyltitanium trichloride, dimethylcyclopentadienyltitanium trimethyl, dimethylcyclopentadienyltitanium trimethoxide, dimethylcyclopentadienyltitanium tribenzyl, trimethylcyclopentadienyltitanium trichloride, trimethylcyclopentadienyltitanium trimethyl, trimethylcyclopentadienyltitanium trimethoxide, trimethylcyclopentadienyltitanium tribenzyl, tetramethylcyclopentadienyltitanium trichloride, tetramethylcyclopentadienyltitanium trimethyl, tetramethylcyclopentadienyltitanium trimethoxide, tetramethylcyclopentadienyltitanium tribenzyl, pentamethylcyclopentadienyltitanium trichloride, pentamethylcyclopentadienyltitanium trimethyl, pentamethylcyclopentadienyltitanium trimethoxide, pentamethylcyclopentadienyltitanium tribenzyl, indenyltitanium trichloride, indenyltitanium trimethyl, indenyltitanium trimethoxide, indenyltitanium tribenzyl, 1-methylindenyltitanium trichloride, 1-methylindenyltitanium trimethyl, 1-methylindenyltitanium trimethoxide, 1-methylindenyltitanium tribenzyl, 2-methylindenyltitanium trichloride, 2-methylindenyltitanium trimethyl, 2-methylindenyltitanium trimethoxide, 2-methylindenyltitanium tribenzyl, 1,2-dimethylindenyltitanium trichloride, 1,2-dimethylindenyltitanium trimethyl, 1,2-dimethylindenyltitanium trimethoxide, 1,2-dimethylindenyltitanium tribenzyl, 1,3-dimethylindenyltitanium trichloride, 1,3-dimethylindenyltitanium trimethyl, 1,3-dimethylindenyltitanium trimethoxide, 1,3-dimethylindenyltitanium tribenzyl, 1,2,3-trimethylindenyltitanium trichloride, 1,2,3-trimethylindenyltitanium trimethyl, 1,2,3-trimethylindenyltitanium trimethoxide, 1,2,3-trimethylindenyltitanium tribenzyl, 1,2,3,4,5,6,7-heptamethylindenyltitanium trichloride, 1,2,3,4,5,6,7-heptamethylindenyltitanium trimethyl, 1,2,3,4,5,6,7-heptamethylindenyltitanium trimethoxide, 1,2,3,4,5,6,7-heptamethylindenyltitanium tribenzyl, 4,5,6,7-tetrahydroindenyltitanium trichloride, 4,5,6,7-tetrahydroindenyltitanium trimethyl, 4,5,6,7-tetrahydroindenyltitanium trimethoxide, 4,5,6,7-tetrahydroindenyltitanium tribenzyl, 1-methyl-4,5,6,7-tetrahydroindenyltitanium trichloride, 1-methyl-4,5,6,7-tetrahydroindenyltitanium trimethyl, 1-methyl-4,5,6,7-tetrahydroindenyltitanium trimethoxide, 1-methyl-4,5,6,7-tetrahydroindenyltitanium tribenzyl, 2-methyl-4,5,6,7-tetrahydroindenyltitanium trichloride, 2-methyl-4,5,6,7-tetrahydroindenyltitanium trimethyl, 2-methyl-4,5,6,7-tetrahydroindenyltitanium trimethoxide, 2-methyl-4,5,6,7-tetrahydroindenyltitanium tribenzyl, 1,2-dimethyl-4,5,6,7-tetrahydroindenyltitanium trichloride, 1,2-dimethyl-4,5,6,7-tetrahydroindenyltitanium trimethyl, 1,2-dimethyl-4,5,6,7-tetrahydroindenyltitanium trimethoxide, 1,2-dimethyl-4,5,6,7-tetrahydroindenyltitanium tribenzyl, 1,3-dimethyl-4,5,6,7-tetrahydroindenyltitanium trichloride, 1,3-dimethyl-4,5,6,7-tetrahydroindenyltitanium trimethyl, 1,3-dimethyl-4,5,6,7-tetrahydroindenyltitanium trimethoxide, 1,3-dimethyl-4,5,6,7-tetrahydroindenyltitanium tribenzyl, 1,2,3-trimethyl-4,5,6,7-tetrahydroindenyltitanium trichloride, 1,2,3-trimethyl-4,5,6,7-tetrahydroindenyltitanium trimethyl, 1,2,3-trimethyl-4,5,6,7-tetrahydroindenyltitanium trimethoxide, 1,2,3-trimethyl-4,5,6,7-tetrahydroindenyltitanium tribenzyl, 1-ethyl-4,5,6,7-tetrahydroindenyltitanium trichloride, 1-ethyl-4,5,6,7-tetrahydroindenyltitanium trimethyl, 1-ethyl-4,5,6,7-tetrahydroindenyltitanium trimethoxide, 1-ethyl-4,5,6,7-tetrahydroindenyltitanium tribenzyl, 1-ethyl-2-methyl-4,5,6,7-tetrahydroindenyltitanium trichloride, 1-ethyl-2-methyl-4,5,6,7-tetrahydroindenyltitanium trimethyl, 1-ethyl-2-methyl-4,5,6,7-tetrahydroindenyltitanium trimethoxide, 1-ethyl-2-methyl-4,5,6,7-tetrahydroindenyltitanium tribenzyl, 1-ethyl-3-methyl-4,5,6,7-tetrahydroindenyltitanium trichloride, 1-ethyl-3-methyl-4,5,6,7-tetrahydroindenyltitanium trimethyl, 1-ethyl-3-methyl-4,5,6,7-tetrahydroindenyltitanium trimethoxide, 1-ethyl-3-methyl-4,5,6,7-tetrahydroindenyltitanium tribenzyl, 1-ethyl-2,3-dimethyl-4,5,6,7-tetrahydroindenyltitanium trichloride, 1-ethyl-2,3-dimethyl-4,5,6,7-tetrahydroindenyltitanium trimethyl, 1-ethyl-2,3-dimethyl-4,5,6,7-tetrahydroindenyltitanium trimethoxide, 1-ethyl-2,3-dimethyl-4,5,6,7-tetrahydroindenyltitanium tribenzyl, 1,2-diethyl-4,5,6,7-tetrahydroindenyltitanium trichloride, 1,2-diethyl-4,5,6,7-tetrahydroindenyltitanium trimethyl, 1,2-diethyl-4,5,6,7-tetrahydroindenyltitanium trimethoxide, 1,2-diethyl-4,5,6,7-tetrahydroindenyltitanium tribenzyl, 1,2-diethyl-3-methyl-4,5,6,7-tetrahydroindenyltitanium trichloride, 1,2-diethyl-3-methyl-4,5,6,7-tetrahydroindenyltitanium trimethyl, 1,2-diethyl-3-methyl-4,5,6,7-tetrahydroindenyltitanium trimethoxide, 1,2-diethyl-3-methyl-4,5,6,7-tetrahydroindenyltitanium tribenzyl, 1,3-diethyl-4,5,6,7-tetrahydroindenyltitanium trichloride, 1,3-diethyl-4,5,6,7-tetrahydroindenyltitanium trimethyl, 1,3-diethyl-4,5,6,7-tetrahydroindenyltitanium trimethoxide, 1,3-diethyl-4,5,6,7-tetrahydroindenyltitanium tribenzyl, 1,3-diethyl-2-methyl-4,5,6,7-tetrahydroindenyltitanium trichloride, 1,3-diethyl-2-methyl-4,5,6,7-tetrahydroindenyltitanium trimethyl, 1,3-diethyl-2-methyl-4,5,6,7-tetrahydroindenyltitanium trimethoxide, 1,3-diethyl-2-methyl-4,5,6,7-tetrahydroindenyltitanium tribenzyl, 1,2,3-triethyl-4,5,6,7-tetrahydroindenyltitanium trichloride, 1,2,3-triethyl-4,5,6,7-tetrahydroindenyltitanium trimethyl, 1,2,3-triethyl-4,5,6,7-tetrahydroindenyltitanium trimethoxide, 1,2,3-triethyl-4,5,6,7-tetrahydroindenyltitanium tribenzyl, 2-ethyl-4,5,6,7-tetrahydroindenyltitanium trichloride, 2-ethyl-4,5,6,7-tetrahydroindenyltitanium trimethyl, 2-ethyl-4,5,6,7-tetrahydroindenyltitanium trimethoxide, 2-ethyl-4,5,6,7-tetrahydroindenyltitanium tribenzyl, 1-methyl-2-ethyl-4,5,6,7-tetrahydroindenyltitanium trichloride, 1-methyl-2-ethyl-4,5,6,7-tetrahydroindenyltitanium trimethyl, 1-methyl-2-ethyl-4,5,6,7-tetrahydroindenyltitanium trimethoxide, 1-methyl-2-ethyl-4,5,6,7-tetrahydroindenyltitanium tribenzyl, 1,3-dimethyl-2-ethyl-4,5,6,7-tetrahydroindenyltitanium trichloride, 1,3-dimethyl-2-ethyl-4,5,6,7-tetrahydroindenyltitanium trimethyl, 1,3-dimethyl-2-ethyl-4,5,6,7-tetrahydroindenyltitanium trimethoxide, 1,3-dimethyl-2-ethyl-4,5,6,7-tetrahydroindenyltitanium tribenzyl, 1,2,3,4-tetrahydrofluorenyltitanium trichloride, 1,2,3,4-tetrahydrofluorenyltitanium trimethyl, 1,2,3,4-tetrahydrofluorenyltitanium trimethoxide, 1,2,3,4-tetrahydrofluorenyltitanium tribenzyl, 9-methyl-1,2,3,4-tetrahydrofluorenyltitanium trichloride, 9-methyl-1,2,3,4-tetrahydrofluorenyltitanium trimethyl, 9-methyl-1,2,3,4-tetrahydrofluorenyltitanium trimethoxide, 9-methyl-1,2,3,4-tetrahydrofluorenyltitanium tribenzyl, 9-ethyl-1,2,3,4-tetrahydrofluorenyltitanium trichloride, 9-ethyl-1,2,3,4-tetrahydrofluorenyltitanium trimethyl, 9-ethyl-1,2,3,4- tetrahydrofluorenyltitanium trimethoxide, 9-ethyl-1,2,3,4-tetrahydrofluorenyltitanium tribenzyl, 1,2,3,4,5,6,7,8-octahydrofluorenyltitanium trichloride, 1,2,3,4,5,6,7,8-octahydrofluorenyltitanium trimethyl, 1,2,3,4,5,6,7,8-octahydrofluorenyltitanium trimethoxide, 1,2,3,4,5,6,7,8-octahydrofluorenyltitanium tribenzyl, 9-methyl-1,2,3,4,5,6,7,8-octahydrofluorenyltitanium trichloride, 9-methyl-1,2,3,4,5,6,7,8-octahydrofluorenyltitanium trimethyl, 9-methyl-1,2,3,4,5,6,7,8-octahydrofluorenyltitanium trimethoxide, 9-methyl-1,2,3,4,5,6,7,8-octahydrofluorenyltitanium tribenzyl, 9-ethyl-1,2,3,4,5,6,7,8-octahydrofluorenyltitanium trichloride, 9-ethyl-1,2,3,4,5,6,7,8-octahydrofluorenyltitanium trimethyl, 9-ethyl-1,2,3,4,5,6,7,8-octahydrofluorenyltitanium trimethoxide, 9-ethyl-1,2,3,4,5,6,7,8-octahydrofluorenyltitanium tribenzyl, compounds obtained by replacing titanium in the above compounds with zirconium or hafnium and similar compounds of transition metal elements of other Groups and Lanthanoid series. However, the compound represented by general formula (VIII) is not limited to the compounds shown above as the examples. Among the above compounds, titanium compounds are preferable.

(c) Examples of the compound represented by general formula (IX) include the following compounds: tetramethyltitanium, tetrabenzyltitanium, tetraethyltitanium, tetraphenyltitanium, tetramethoxytitanium, tetraethoxytitanium, tetraphenoxytitanium, tetra(dimethylamino)titanium, tetra(diethylamino)titanium, tetra(diphenylamino)titanium, bis(phenoxo)titanium compounds described in Macromolecules 1997, 30, 1562–1569 and Journal of Organometallic Chemistry 514 (1996), 213–217, diamidotitanium compounds described in Macromolecules 1996, 29, 5241–5243 and Organometallics 1997, 16, 1491–1496, compounds obtained by replacing titanium in the above compounds with zirconium or hafnium and similar compounds of transition metals of other Groups and Lanthanoid series.

(d) In the transition metal compounds represented by general formula (X), $M^2$ represents a transition metal of Group 8 to 10 of the Periodic Table. Examples of such transition metal include iron, cobalt, nickel, palladium and platinum. Among these transition metals, nickel and palladium are preferable. $L^1$ and $L^2$ each represent a ligand forming a coordinating bond and $X^1$ and $Y^1$ each represent a ligand forming a covalent bond or a ligand forming an ionic bond. As described above, specifically, $X^1$ and $Y^1$ each represent hydrogen atom, a halogen atom; a hydrocarbon group having 1 to 20 carbon atoms and preferably 1 to 10 carbon atoms, an alkoxyl group having 1 to 20 carbon atoms and preferably 1 to 10 carbon atoms, amino group, a hydrocarbon group having phosphorus atom and 1 to 20 carbon atoms and preferably 1 to 12 carbon atoms such as diphenylphosphine group, a hydrocarbon group having silicon atom and 1 to 20 carbon atoms and preferably 1 to 12 carbon atoms such as trimethylsilyl group or a boron compound having a hydrocarbon group having 1 to 20 carbon atoms and preferably 1 to 12 carbon atoms or halogen atoms such as $B(C_6H_5)_4$ and $BF_4$. Among these ligands, halogen atoms and hydrocarbon groups are preferable. $X^1$ and $Y^1$ may represent the same ligand or different ligands. Examples of the ligands represented by $L^1$ and $L^2$ include triphenylphosphine, acetonitrile, benzonitrile, 1,2-bisdiphenylphosphinoethane, 1,3-bisdiphenylphosphinopropane, 1,1'-bisdiphenylphosphinoferrocene, cyclooctadiene, pyridine and bistrimethylsilylaminobistrimethyliminophosphorane.

The groups represented by $L^1$, $L^2$, $X^1$ and $Y^1$ may be bonded to each to other to form a cyclic structure.

As the transition metal compounds of Groups 8 to 10 of the Periodic Table which are represented by general formula (X), compounds having a diimine compound as the ligand are preferable. Examples of such compounds include complex compounds represented by the following general formula (XVIII):

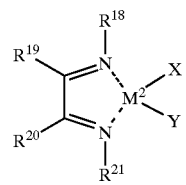

(XVIII)

wherein $R^{18}$ and $R^{21}$ each independently represent an aliphatic hydrocarbon group having 1 to 20 carbon atoms or an aromatic group having 7 to 20 total carbon atoms and a hydrocarbon group on the ring, $R^{19}$ and $R^{20}$ each independently represent hydrogen atom or a hydrocarbon group having 1 to 20 carbon atoms, the groups represented by $R^{19}$ and $R^{20}$ may be bonded to each other to form a ring, X and Y each independently represent hydrogen atom or a hydrocarbon group having 1 to 20 carbon atoms and $M^2$ represents a transition metal selected from metals of Groups 8 to 10 of the Periodic Table.

In the above general formula (XVIII), examples of the aliphatic hydrocarbon group having 1 to 20 carbon atoms which is represented by $R^{18}$ or $R^{21}$ include linear and branched alkyl groups having 1 to 20 carbon atoms and cycloalkyl groups having 3 to 20 carbon atoms. Specific examples of such groups include methyl group, ethyl group, n-propyl group, isopropyl group, n-butyl group, isobutyl group, sec-butyl group, tert-butyl group, pentyl group, hexyl group, octyl group, decyl group, tetradecyl group, hexadecyl group, octadecyl group, cyclopentyl group, cyclohexyl group and cyclooctyl group. The cycloalkyl group may have suitable substituents such as lower alkyl groups on the ring. Examples of the aromatic group having 7 to 20 total carbon atoms and a hydrocarbon group on the ring include groups having aromatic rings such as phenyl group and naphthyl group and one or more linear, branched or cyclic alkyl groups having 1 to 10 carbon atoms introduced into the aromatic rings. As the group represented by $R^{18}$ or $R^{21}$, aromatic groups having hydrocarbon groups on the ring are preferable and 2,6-diisopropylphenyl group is more preferable. $R^{18}$ and $R^{21}$ may represent the same group or different groups.

Examples of the hydrocarbon group having 1 to 20 carbon atoms which is represented by $R^{19}$ or $R^{20}$ include linear and branched alkyl groups having 1 to 20 carbon atoms, cycloalkyl groups having 3 to 20 carbon atoms, aryl groups having 6 to 20 carbon atoms and aralkyl groups having 7 to 20 carbon atoms. Examples of the linear and branched alkyl groups having 1 to 20 carbon atoms and the cycloalkyl groups having 3 to 20 carbon atoms include the groups described above as the examples of the aliphatic hydrocarbon group having 1 to 20 carbon atoms which is represented by $R^{18}$ or $R^{21}$. Examples of the aryl group having 6 to 20 carbon atoms include phenyl group, tolyl group, xylyl group, naphthyl group and methylnaphthyl group. Examples of the aralkyl group having 7 to 20 carbon atoms include benzyl group and phenyl group. The groups represented by $R^{19}$ and $R^{20}$ may be the same with or different from each other and may be bonded to each other to form a ring.

Examples of the hydrocarbon group having 1 to 20 carbon atoms which is represented by X or Y include the groups described above as the examples of the hydrocarbon group having 1 to 20 carbon atoms which is represented by $R^{19}$ or $R^{20}$. It is preferable that X and Y represent methyl group. X and Y may represent the same group or different groups.

Examples of the transition metal selected from metals of Groups 8 to 10 of the Periodic Table which is represented by $M^2$ include nickel, palladium, platinum, iron, cobalt, rhodium and ruthenium. Among these metals, nickel and palladium are preferable.

Examples of the complex compound represented by general formula (XVIII) include compounds expressed by the following formulae:

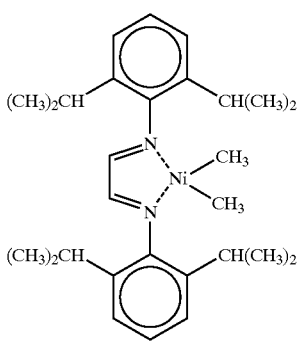

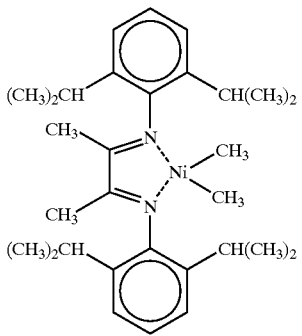

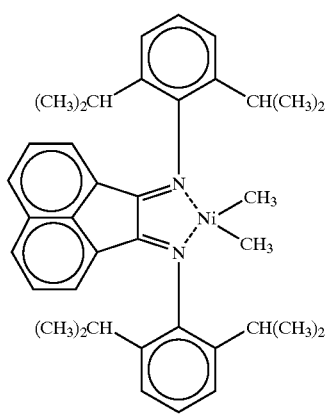

-continued

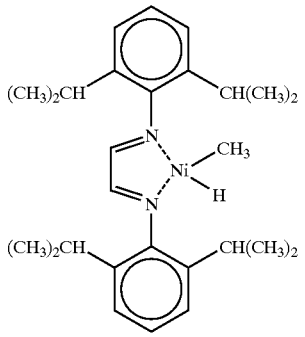

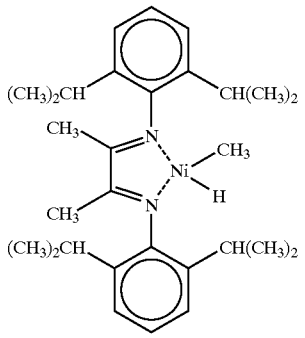

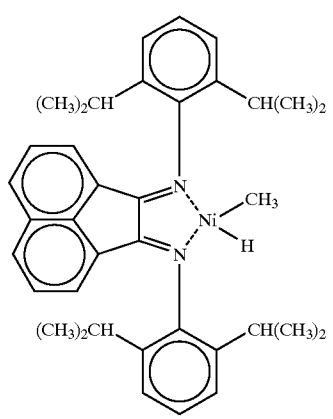

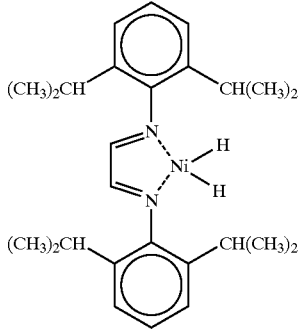

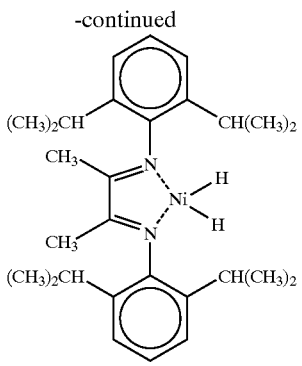

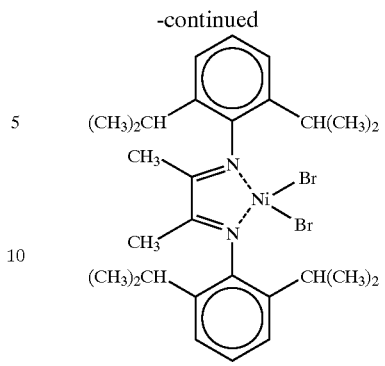

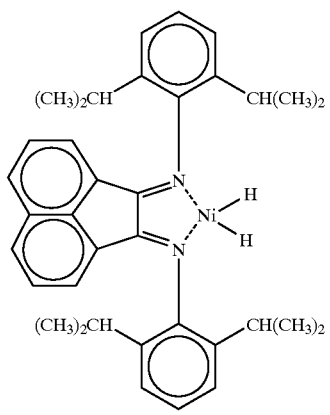

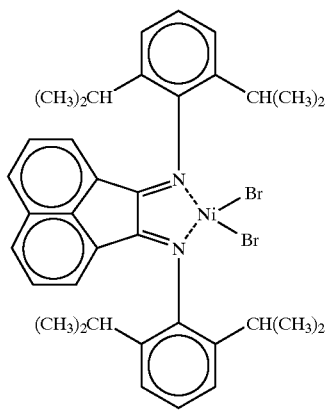

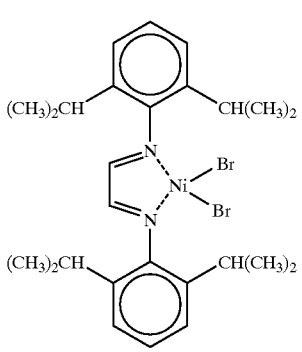

Specific examples of the transition metal compound represented by general formula (XVIII) include dibromobistriphenylphosphine nickel, dichlorobistriphenylphosphine nickel, dibromodiacetonitrile nickel, dibromodibenzonitrile nickel, dibromo(1,2-bisdiphenylphosphinoethane) nickel, dibromo(1,3-bisdiphenylphosphinopropane) nickel, dibromo(1,1'-diphenylbisphosphinoferrocene) nickel, dimethylbisdiphenylphosphine nickel, dimethyl(1,2-bisdiphenylphosphinoethane) nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane) palladium, bistriphenylphosphinepalladium bistetrafluoroborate and bis(2,2'-bipyridine)methyliron tetrafluoroborate etherate.

Among these compounds, cationic complex compounds such as methyl(1,2-bisdiphenylphosphinoethane)nickel tetrafluoroborate, bistriphenylphosphinepalladium bistetrafluoroborate and bis(2,2'-bipyridine)methyliron tetrafluoroborate etherate are preferable.

In the present invention, the above complex compounds may be used singly or in combination of two or more.

Component (B)

Component (B) comprises at least one compound selected from [a] compounds having oxygen and [b] compounds which can form ionic complex compounds by reaction with the transition metal compound. Among these compounds, the compounds having oxygen of component [a] are preferable.

The compound having oxygen of component [a] is a compound having oxygen which is at least one of compounds represented by the following general formula (XIX):

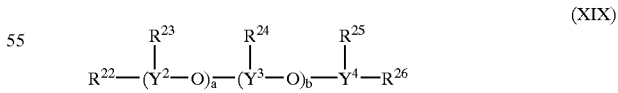

(XIX)

and compounds represented by the following general formula (XX):

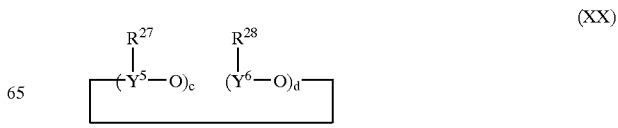

(XX)

In the above general formulae (XIX) and (XX), $R^{22}$ to $R^{28}$ each represent an alkyl group having 1 to 8 carbon atoms. Examples of the alkyl group include methyl group, ethyl group, n-propyl group, isopropyl group, various types of butyl group, various types of pentyl group, various types of hexyl group, various types of heptyl group and various types of octyl group. $R^{22}$ to $R^{26}$ may represent the same group or different groups. $R^{27}$ and $R^{28}$ may represent the same group or different groups. $Y^2$ to $Y^6$ each represent an element of Group 13. Example of such an element include B, Al, Ga, In and Tl. Among these elements, B and Al are preferable. $Y^2$ to $Y^4$ may represent the same element or different elements. $Y^5$ and $Y^6$ may represent the same element or different elements. a to d each represent a number of 0 to 50 and (a+b) and (c+d) represent each a number of 1 or greater. It is preferable that a to d each represent a number in the range of 1 to 20 and more preferably in the range of 1 to 5.

As the compound having oxygen used as the component of the catalyst, alkylaluminoxanes are preferable. Examples of the alkylaluminoxane include methylaluminoxane and isobutylaluminoxane.

Component (B) may also comprise [b] a compound which can form an ionic complex compound by reaction with the transition metal compound.

Examples of the compound which can form an ionic complex compound by reaction with the transition metal compound include Lewis acids and coordinated complex compounds comprising an anion in which a plurality of groups are bonded to a metal and a cation. As the coordinated complex compound comprising an anion in which a plurality of groups are bonded to a metal and a cation, various compounds can be used. Examples of such a compound include compounds represented by the following general formulae (XXI) and (XXII):

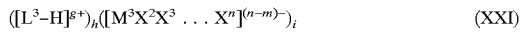

(XXI)

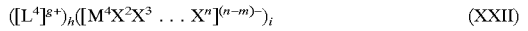

(XXII)

In general formulae (XXI) and (XXII), $L^4$ represents a metal represented by $M^5$ or a group represented by $R^{29}R^{30}M^6$ or $R^{31}{}_3C$ which will be described later; $L^3$ represents a Lewis base; $M^3$ and $M^4$ each represent a metal selected from metals of Groups 5 to 15 of the Periodic Table; $M^5$ represents a metal selected from metals of Group 1 and Groups 8 to 12 of the Periodic Table; $M^6$ represents a metal selected from metals of Groups 8 to 10 of the Periodic Table; $X^2$ to $X^n$ each represent hydrogen atom, a dialkylamino group, an alkoxyl group, an aryloxyl group, an alkyl group having 1 to 20 carbon atoms, an aryl group having 6 to 20 carbon atoms, an alkylaryl group, an arylalkyl group, a substituted alkyl group, an organometalloid group or a halogen atom; $R^{29}$ and $R^{30}$ each represent cyclopentadienyl group, a substituted cyclopentadienyl group, indenyl group or fluorenyl group; $R^{31}$ represents an alkyl group; m represents the valence of the atom represented by $M^3$ or $M^4$ which is an integer of 1 to 7; n represents an integer of 2 to 8, g represents the ionic valence of an ion represented by $L^3$—H or $L^4$ which is an integer of 1 to 7; h represents an integer of 1 or greater; and i=h×g/(n−m).

Examples of the metal represented by $M^3$ and $M^4$ include B, Al, Si, P, As and Sb. Examples of the metal represented by $M^5$ include Ag, Cu, Na and Li. Examples of the metal represented by $M^6$ include Fe, Co and Ni. Examples of the group represented by $X^2$ to $X^n$ include dialkylamino groups such as dimethylamino group and diethylamino group; alkoxyl groups such as methoxy group, ethoxy group and n-butoxy group; aryloxyl groups such as phenoxy group, 2,6-dimethylphenoxy group and naphthyloxy group; alkyl groups having 1 to 20 carbon atoms such as methyl group, ethyl group, n-propyl group, isopropyl group, n-butyl group, n-octyl group and 2-ethylhexyl group; aryl groups having 6 to 20 carbon atoms, alkylaryl groups and arylalkyl groups such as phenyl group, p-tolyl group, benzyl group, pentafluorophenyl group, 3,5-di(trifluoromethyl)phenyl group, 4-tertiary-butylphenyl group, 2,6-dimethylphenyl group, 3,5-dimethylphenyl group, 2,4-dimethylphenyl group and 1,2-dimethylphenyl group; halogen atoms such as F, Cl, Br and I; and organometalloid groups such as pentamethylantimony group, trimethylsilyl group, trimethylgermyl group, diphenylarsine group, dicyclohexylarsine group and diphenylboron group. Examples of the substituted cyclopentadienyl group represented by $R^{29}$ and $R^{30}$ include methylcyclopentadienyl group, butylcyclopentadienyl group and pentamethylcyclopentadienyl group.

In the present invention, examples of the anion in which a plurality of groups are bonded to a metal include $B(C_6F_5)_4{}^-$, $B(C_6HF_4)_4{}^-$, $B(C_6H_2F_3)_4{}^-$, $B(C_6H_3F_2)_4{}^-$, $B(C_6H_4F)_4{}^-$, $B(C_6CF_3F_4)—P(C_6F_5)_6{}^-$ and $Al(C_6HF_4)_4{}^-$. Examples of metal cations as the above cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$ and $Li^+$. Examples of other cations as the above cation include cations of compounds having nitrogen atom such as pyridinium cation, 2,4-dinitro-N,N-diethylanilinium cation, diphenylammonium cation, p-nitroanilinium cation, 2,5-dichloro-anilinium cation, p-nitro-N,N-dimethylanilinium cation, quinolinium cation, N,N-dimethylanilinium cation and N,N-diethylanilinium cation; carbenium cations such as triphenyl carbenium cation, tri(4-methylphenyl)carbenium cation and tri(4-methoxyphenyl)carbenium cation; alkylphosphonium ions such as $CH_3PH_3{}^+$, $C_2H_5PH_3{}^+$, $C_3H_7PH_3{}^+$, $(CH_3)_2PH_2{}^+$, $(C_2H_5)_2PH_2{}^+$, $(C_3H_7)_2PH_2{}^+$, $(CH_3)_3PH^+$, $C_2H_5)_3PH^+$, $(C_3H_7)_3PH^+$, $(CF_3)_3PH^+$, $(CH_3)_4P^+$, $(C_2H_5)_4P^+$ and $(C_3H_7)_4P^+$; and arylphosphonium ions such as $C_6H_5PH_3{}^+$, $(C_6H_5)_2PH_2{}^+$, $(C_6H_5)_3PH^+$, $(C_6H_5)_4P^+$, $(C_2H_)_2(C_6H_5)PH^+$, $(CH_3)(C_6H_5)PH_2{}^+$, $(CH_3)_2(C_6H_5)PH^+$ and $(C_2H_5)_2(C_6H_5)_2P^+$.

Among the compounds represented by general formulae (XXI) and (XXII), the following compounds can be preferably used. Examples of the preferable compound represented by general formula (XXI) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl) borate, pyrrolinium tetrakis(pentafluorophenyl)borate, N,N-dimethylanilinium tetrakis(pentafluorophenyl)borate and methyldiphenylammonium tetrakis(pentafluorophenyl) borate. Examples of the preferable compound represented by general formula (XXII) include ferrocenium tetraphenylborate, dimethyferrocenium tetrakis (pentafluorophenyl)borate, ferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate and silver tetrafluoroborate.

Examples of the Lewis acid include $B(C_6F_6)_3$, $B(C_6HF_4)_3$, $B(C_6H_2F_3)_3$, $B(C_6H_3F_2)_3$, $B(C_6H_4F)_3$, $B(C_6H_5)_3$, $BF_3$, $B(C_6CF_3F_4)_3$, $PF_5$, $P(C_6F_5)_5$ and $Al(C_6HF_4)_3$.

Component (C)

In the catalyst used in the process of the present invention, where necessary, (C) an organometallic compound may also be used in combination with component (A) and component (B) described above.

The organometallic compound of component (C) comprises a compound represented by the following general formula (XXIII):

$$((R^{32})_3-X-Y)_n-Z-(R^{33})_{m-n} \qquad (XXIII)$$

and an alkylating agent which is used where necessary.

In general formula (XXIII), $R^{32}$ represents hydrogen atom, a halogen atom, an aliphatic hydrocarbon group having 1 to 30 carbon atoms, an aromatic hydrocarbon group having 6 to 30 carbon atoms, an alkoxyl group having 1 to 30 carbon atoms, an aryloxyl group having 6 to 30 carbon atoms, a thioalkoxyl group having 1 to 30 carbon atoms, a thioaryloxyl group having 6 to 30 carbon atoms, amino group, amido group or carboxyl group; the plurality of groups represented by $R^{32}$ may be the same with or different from each other and may be bonded to each other to form a cyclic structure; X represents an element of Group 14; Y represents an element of Group 16, Z represents a metal element selected from elements of Groups 2 to 13; $R^{33}$ represents a hydrocarbon group; m represents an integer which is the valence of the metal element represented by Z; and n represents an integer of 1 to (m−1).

Among the compounds represented by general formula (XXIII), the following compounds are preferably used: (1) compounds represented by general formula (XXIII) in which X represents carbon atom, Y represents oxygen atom and Z represents aluminum atom; (2) compounds represented by general formula (XXIII) in which at least one of three $R^{32}$ represents an aromatic hydrocarbon group having 6 to 30 carbon atoms; (3) compounds represented by general formula (XXIII) in which three $R^{32}$ each represent a hydrocarbon group having 1 or more carbon atoms; (4) compounds represented by general formula (XXIII) in which three $R^{32}$ each represent an aromatic hydrocarbon group having 6 to 30 carbon atoms and preferably phenyl group; and (5) compounds represented by general formula (XXIII) in which $R^{33}$ represents an alkyl group having 2 or more carbon atoms.

Specifically, the compound represented by general formula (XXIII) in which three $R^{32}$ each represent phenyl group, X represents carbon atom, Y represents oxygen atom, Z represents aluminum atom, n represents 1 and $R^{33}$ represents isobutyl group is more preferable.

The process for preparing the compound of component (C) is not particularly limited as long as the compound has the structure represented by the above general formula. Compounds obtained by reaction of ① at least one compound selected from compounds represented by general formulae $(R^{32})_3-C-OR^{32}$, $R^{32}-CO-R^{32}$ and $R^{32}-CO-OR^{32}$ with ② a compound represented by a general formula $Z(R^{33})_m$ are preferably used. In the above formulae, $R^{32}$, Z and $R^{33}$ are as defined above.

Specifically, the above compound is a reaction product of at least one compound selected from alcohols, ethers, aldehydes, ketones, carboxylic acids and esters of carboxylic acids with an aluminum compound and preferably a reaction product of an alcohol and an aluminum compound. Among these reaction products, compounds satisfying any of the following conditions are preferably used: (1) at least one of three $R^{32}$ in $(R^{32})_3$ represents an aromatic hydrocarbon group having 6 to 30 carbon atoms; (2) three $R^{32}$ in $(R^{32})_3$ each represent a hydrocarbon group having 1 or more carbon atoms; (3) three $R^{32}$ in $(R^{32})_3$ each represent an aromatic hydrocarbon group having 6 to 30 carbon atoms and preferably phenyl group; and (4) $R^{33}$ represents a alkyl group having 2 or more carbon atoms. Specifically, the compound satisfying the condition such that three $R^{32}$ each represent phenyl group and $R^{33}$ represents isobutyl group is more preferable. In other words, the reaction product of triphenylmethyl alcohol with triisobutylaluminum is more preferable.

The condition of the reaction of compound ① with compound ② is not particularly limited. The preferable condition is as follows: the ratio of the amounts by mole of compound ① to compound ② is in the range of 1:0.1 to 10, preferably in the range of 1:0.5 to 2 and more preferably in the range of 1:0.8 to 1.2; the reaction temperature is in the range of −80 to 300° C. and preferably in the range of −10 to 50° C.; and the reaction time is in the range of 0.1 minute to 50 hours and preferably in the range of 0.1 minute to 3 hours. The solvent used in the reaction is not particularly limited. The solvent used for the polymerization is preferable.

As component (C), compound (C1) and compound (C2) which are shown below may be directly added into the field of the synthesis of the catalyst or the field of the polymerization in place of the compound described above. In this case, the components of the catalyst are (A) the transition metal compound, (B) at least one compound selected from compounds having oxygen and compounds which can form ionic complex compounds by reaction with the transition metal compound, compounds (C-1) and (C-2) and an alkylating agent which is used where necessary.

Compound (C-1) is at least one compound selected from compounds represented by general formulae $(R^{32})_3-C-OR^{32}$, $R^{32}-CO-R^{32}$ and $R^{32}-CO-OR^{32}$ and compound (C-2) is a compound represented by a general formula $Z(R^{33})_m$.

In the above general formulae, $R^{32}$ represents hydrogen atom, a halogen atom, an aliphatic hydrocarbon group having 1 to 30 carbon atoms, an aromatic hydrocarbon group having 6 to 30 carbon atoms, an alkoxyl group having 1 to 30 carbon atoms, an aryloxyl group having 6 to 30 carbon atoms, a thioalkoxyl group having 1 to 30 carbon atoms, a thioaryloxyl group having 6 to 30 carbon atoms, amino group, amido group or carboxyl group; the plurality of groups represented by $R^{32}$ may be the same with or different from each other and may be bonded to each other to form a cyclic structure; Z represents a metal element of any of Groups 2 to 13; m represents an integer which is the valence of the metal element represented by Z; and $R^{33}$ represents a hydrocarbon group.

Specifically, compound (C-1) is at least one compound selected from alcohols, ethers, aldehydes, ketones, carboxylic acids and esters of carboxylic acids and preferably an alcohol and compound (C-2) is an aluminum compound. Compounds satisfying any of the following conditions are preferably used: (1) at least one of three $R^{32}$ in $(R^{32})_3$ represents an aromatic hydrocarbon group having 6 to 30 carbon atoms; (2) three $R^{32}$ in $(R^{32})_3$ each represent a hydrocarbon group having 1 or more carbon atoms; (3) three $R^{32}$ in $(R^{32})_3$ each represent an aromatic hydrocarbon group having 6 to 30 carbon atoms and preferably phenyl group; and (4) $R^{33}$ represents a alkyl group having 2 or more carbon atoms. More specifically, triphenylmethyl alcohol is more preferable as compound (C-1) and triisobutylaluminum is more preferable as compound (C-2).

Alkylating Agent

Component (C) of the catalyst used in the present invention may comprise an alkylating agent, where necessary.

Various compounds can be used as the alkylating agent. Examples of the alkylating agent include:

aluminum compounds having alkyl groups which are represented by general formula (XXIV):

$$R^{34}{}_m Al(OR^{35})_n X_{3-m-n} \quad \quad (XXIV)$$

wherein $R^{34}$ and $R^{35}$ each represent an alkyl group having 1 to 8 carbon atoms and preferably 1 to 4 carbon atoms, X represents hydrogen atom or a halogen atom, m represents a number satisfying $0<m\leq3$, preferably 2 or 3 and more preferably 3 and n represents a number satisfying $0\leq n<3$ and preferably 0 or 1;

magnesium compounds having alkyl groups which are represented by general formula (XXV):

$$R^{34}{}_2 Mg \quad \quad (XXV)$$

wherein $R^{34}$ is as defined above; and zinc compounds having alkyl groups which are represented by general formula (XXVI):

$$R^{34}{}_2 Zn \quad \quad (XXVI)$$

wherein $R^{34}$ is as defined above.

Among these compounds having alkyl groups, aluminum compound having alkyl groups are preferable and trialkylaluminum compounds and dialkylaluminum compounds are more preferable. Examples of the compound having alkyl groups include trialkylaluminums such as trimethylaluminum, triethylaluminum, tri-n-propylaluminum, triisopropylaluminum, tri-n-butylaluminum, triisobutylaluminum and tri-t-butylaluminum; dialkylaluminum halides such as dimethylaluminum chloride, diethylaluminum chloride, di-n-propylaluminum chloride, diisopropylaluminum chloride, di-n-butylaluminum chloride, diisobutylaluminum chloride and di-t-butylaluminum chloride; dialkylaluminum alkoxides such as dimethylaluminum methoxide and dimethylaluminum ethoxide; dialkylaluminum hydrides such as dimethylaluminum hydride, diethylaluminum hydride and diisobutylaluminum hydride; dialkyl-magnesiums such as dimethylmagnesium, diethylmagnesium, di-n-propylmagnesium and diisopropylmagnesium; and dialkylzincs such as dimethylzinc, diethylzinc, di-n-propylzinc and diisopropylzinc.

The catalyst can be prepared in accordance with the following process.

(1) Order of Contact of the Components

In the present invention, the order of bringing the components into contact with each other is not particularly limited. The components can be brought into contact with each other in orders shown in the following.

(i) When component (A), component (B) and component (C) are used, for example, ① component (A) is brought into contact with component (B) and then component (C) is brought into contact with the resultant mixture; ② component (A) is brought into contact with component (C) and then component (B) is brought into contact with the resultant mixture; ③ component (B) is brought into contact with component (C) and then component (A) is brought into contact with the resultant mixture; or ④ three components are simultaneously brought into contact with each other.

When an alkylating agent is used as one of component (C) in accordance with necessity, the order of bringing component (C) into contact with other components is not particularly limited. The alkylating agent may be used after being brought into contact with component (A); the alkylating agent may be used after being brought into contact with component (B); the alkylating agent may be used after being brought into contact with the organometallic compound represented by general formula (XXIII) of component (C); or component (A), component (B) and the alkylating agent as one of component (C) are brought into contact with each other in advance and then the organometallic compound represented by general formula (XXIII) of component (C) may be brought into contact with the resultant mixture.

(ii) When component (A), component (B), component (C1) and component (C2) are used, similarly to (i) described above, the order of bringing the components into contact with each other is not particularly limited. It is preferable that component (C1) and component (C2) are brought into each other before these components are brought into contact with other components. When an alkylating agent is used in accordance with necessity, the components may be brought into contact with each other in a similar manner to that in (i) described above.

(2) Relative Amounts of the Components

When the compound having oxygen is used as component (B) and an organoaluminum compound is used as the compound having oxygen, the organoaluminum compound is used in an amount such that the amount of aluminum atom is, in general, in the range of 1 to 10,000 moles and preferably in the range of 10 to 1,000 moles per 1 mole of component (A). When the compound which can form an ionic complex compound by reaction with the transition metal compound is used as component (B) and a boron compound is used as the compound which can form an ionic complex compound by reaction with the transition metal compound, the boron compound is used in an amount such that the amount of boron atom is, in general, in the range of 0.5 to 10 moles and preferably in the range of 0.8 to 5 moles per 1 mole of component (A).

When component (C), is used, the amount of component (C) is as follows. When an aluminum compound is used as the organometallic compound represented by general formula (XXIII), the aluminum compound is used in an amount such that the amount of aluminum atom is in the range of 0.5 to 1,000 moles and preferably in the range of 1 to 100 moles per 1 mole of component (A). When an alkylating agent is used and an aluminum compound is used as the alkylating agent, the aluminum compound is used in an amount such that the amount of aluminum atom is in the range of greater than 0 (excluding 0) to 1,000 moles, preferably in the range of 1 to 500 moles and more preferably in the range of 10 to 300 moles per 1 mole of component (A).

When component (C) is not used but component (C1) and component (C2) are used, the amounts of the components are as follows. The ratio of the amounts by mole of component (Cl) to component (C2) is selected in the range of 1:0.1 to 10, preferably in the range of 1:0.5 to 2 and more preferably in the range of 1:0.8 to 1.2. Component (C2) is used in an amount such that the amount of aluminum atom is in the range of 0.5 to 1,000 moles and preferably in the range of 1 to 100 moles of per 1 mole of component (A). The amount of the alkylating agent is the same as that described above.

(3) Condition of Contact of the Components

The components of the catalyst can be brought into contact with each other in an inert gas such as nitrogen gas at the temperature of the polymerization or lower. The temperature may be in the range of −30 to 200° C.

In the process of the present invention, the metal compound described above is brought into interaction with the vinyl compound having a functional group and the functional group is masked. For this purpose, it is sufficient that the vinyl compound having a functional group is brought into contact with the metal compound and the conditions of the contact such as the order of addition, the presence or the absence of a solvent, the temperature and the time during the contact are not particularly limited. As for the amount of the metal compound relative to the amount of the vinyl compound having a functional group, the amount of the metal compound is 1 mole or more and preferably in the range of 1 to $10^9$ moles per 1 mole of the vinyl compound having a functional group. When the vinyl compound having a functional group treated as described above is used for the copolymerization with the styrenic compound, the liquid obtained after the masking which contains the residual metal compound may be used for the polymerization without any treatments or the masked vinyl compound having a functional group may be isolated from the liquid obtained after the masking and used for the copolymerization.

It is considered that, by masking the vinyl compound having a functional group with the metal compound, interaction between the metal compound and the functional group takes place and a vinyl compound containing the metal compound is formed. As the interaction, the following three reactions may be considered: (1) the reaction of the active hydrogen in formyl group, carbonyl group or imino group with a substituent group of the metal compound, (2) the reaction of formyl group, carbonyl group or imino group with a substituent group of the metal compound and (3) coordination of the metal compound to ether group or tertiary amino group. However, the interaction is not limited to the above reactions.

Examples of the above reactions (1), (2) and (3) are shown in the following:

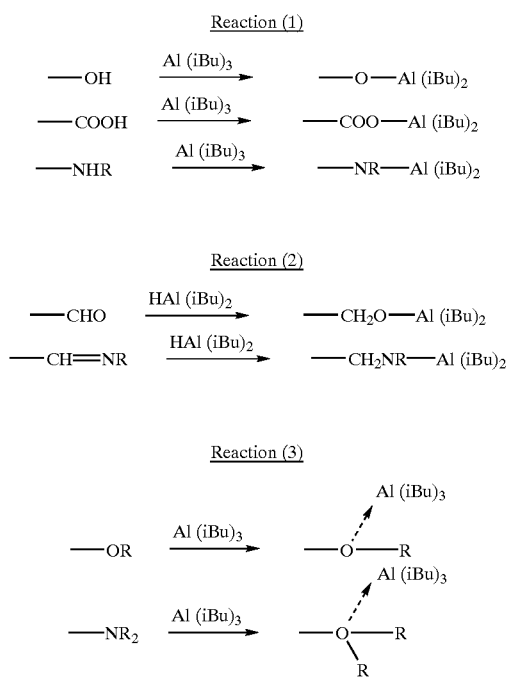

(R: a hydrocarbon group; iBu: isobutyl group)

Reactions (1), (2) and (3) can be confirmed by the measurement of the proton nuclear magnetic resonance spectrum ($^1$H-NMR). For example, reaction (1) can be confirmed by disappearance of the peak of the active hydrogen derived from the vinyl compound due to the interaction with the metal compound. Reactions (2) and (3) can be confirmed by the change in the chemical shift of the peak derived from the vinyl compound to a different value due to the interaction with the metal compound.

In the process of the present invention, the vinyl compound having a functional group which has been masked with the metal compound is copolymerized with the styrenic compound in the presence of the polymerization catalyst described above.

In the copolymerization, a preliminary polymerization may be conducted. The preliminary polymerization can be conducted, for example, by bringing the above catalyst with a small amount of a styrenic compound. The process of the preliminary polymerization is not particularly limited and can be conducted in accordance with a conventional process. The styrenic compound used for the preliminary polymerization is not particularly limited and the styrenic compound described above can be used. The temperature of the preliminary polymerization is, in general, in the range of −20 to 200° C. and preferably in the range of −10 to 130° C. As the solvent, an inert hydrocarbon, an aliphatic hydrocarbon, an aromatic hydrocarbon or a monomer can be used.

The process for copolymerizing the styrenic monomer and the vinyl compound having a functional group is not particularly limited. Any polymerization process such as the slurry polymerization process, the solution polymerization process, the gas phase polymerization process, the bulk polymerization process and the suspension polymerization process can be used. The order of bringing the components of the catalyst and the monomers into contact with each other is not particularly limited. Specifically, the catalyst may be prepared by mixing the components in advance as described above and the monomers may be added to the prepared catalyst. Alternatively, the components of the catalyst and the monomers may be placed into the field of the copolymerization in a desired order without preparing the catalyst in advance by mixing the components. The preferable process is as follows: component (A), component (B) and the alkylating agent in component (C) are mixed together in advance, wherein the compound represented by general formula (XXIII), component (C1) and component (C2) in component (C) are excluded; separately, the monomers are mixed with the compound represented by general formula (XXIII) or a combination of component (C1) and component (C2); and the copolymerization is conducted by mixing the two mixtures prepared above immediately before the copolymerization.

When a solvent is used, examples of the solvent include hydrocarbons and halogenated hydrocarbons such as benzene, toluene, xylene, n-hexane, n-heptane, cyclohexane, methylene chloride, chloroform, 1,2-dichloroethane and chlorobenzene. The solvent may be used singly or in combination of two or more. The monomer used for the copolymerization may be used as the solvent when the type of the monomer is suitable.

As for the conditions of the copolymerization, in general, the pressure is selected in the range of the ordinary pressure to 2,000 kg/cm$^2$·G and the temperature is selected in the range of −50 to 250° C. The molecular weight of the copolymer can be adjusted, for example, by suitably selecting the types and the amounts of the components of the catalyst and the temperature of the copolymerization or by introducing hydrogen.

In the process of the present invention, after the copolymerization is conducted as described above, the metal compound masking the functional group can be removed by bringing the masked functional group into contact with an aqueous solution or an alcohol and the functional group can be regenerated. The desired random copolymer can be obtained after removing the metal compound masking the functional group as described above. The reaction of removal of the metal compound can be shown by the following equations (4) and (5): Reaction (4)

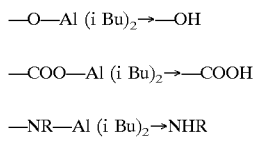

Reaction (5)

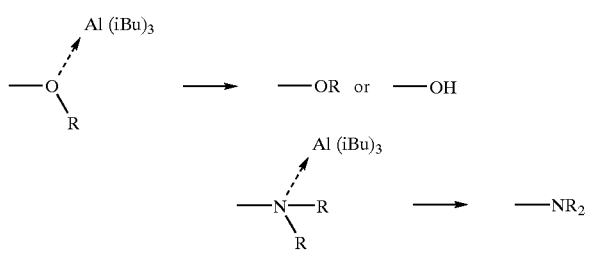

Examples of the aqueous solution include water and aqueous solutions containing an acid or a base. Examples of the acid include HCl, HBr, $HNO_3$, $H_2SO_4$ and $H_3PO_4$ and examples of the base include ammonia, sodium hydroxide and sodium methoxide. Examples of the alcohol include alcohols having 1 to 10 carbon atoms such as methanol, ethanol, isopropanol and t-butanol.

The condition for bringing the aqueous solution or the alcohol into contact with the product of the copolymerization is not particularly limited. The temperature is, in general, in the range of −100 to 300° C. and preferably in the range of 0 to 300° C. The pressure is, in general, in the range of the ordinary pressure to 200 MPa·G.

In accordance with the process of the present invention described above, the styrenic copolymer having a functional group which is a copolymer of the vinyl compound having a functional group and the styrenic monomer and in which the repeating unit derived from the styrenic monomer has the syndiotactic configuration can be efficiently produced.

The random styrenic copolymer of the present invention having a functional group and the syndiotactic configuration comprises:

(a) styrenic repeating units represented by general formula (II):

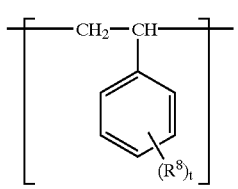

wherein $R^8$ and t are as defined above, and (b) repeating units which are derived from a vinyl compound having a functional group and represented by general formula (III):

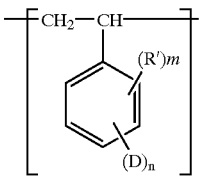

wherein D represents a substituent having $-OR^1$, $-COR^1$, $-CO_2R^1$, $-CN$, $-NR^1R^2$, $-SR^1$ or $-PR^1R^2$, $R^1$ and $R^2$ each representing hydrogen atom, an alkyl group having 1 to 20 carbon atoms, an aryl group having 6 to 20 carbon atoms or an alkylsilyl group having 3 to 20 carbon atoms; R' represents a linear or branched hydrocarbon group having 1 to 20 carbon atoms; when a plurality of D are present, the plurality of D may represent a same group or different groups; n represents an integer of 1 to 5; m represents an integer of 0 to 4; and n+m≦5, wherein the copolymer comprises repeating unit (b) and a steric regularity of the copolymer comprising repeating unit (a) and repeating unit (b) is syndiotactic.

The syndiotactic configuration means that the stereochemical structure has a highly syndiotactic configuration. In other words, phenyl groups of the side groups are alternately placed at the opposite positions with respect to the main chain formed with the carbon-carbon bonds. The tacticity in the stereochemical structure is quantitated by the measurement of the nuclear magnetic resonance using an isotope of carbon ($^{13}$C-NMR). The tacticity measured in accordance with the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, the styrenic copolymer having the syndiotactic configuration means a copolymer having the sequence of the repeating units of the styrenic monomer which generally has a syndiotacticity of 75% or more and preferably 85% or more as expressed in terms of the content of the diad, or 30% or more and preferably 50% or more as expressed in terms of the content of the pentad.

In the copolymer of the present invention, the content of the above repeating unit (b) is selected in the range of 0.01 to 50% by mole. When the content is smaller than 0.01% by mole, the effect of improving the physical properties of the copolymer such as adhesion is not sufficiently exhibited. When the content exceeds 50% by mole, heat resistance of the copolymer deteriorates. From the standpoint of the effect of improving the physical properties and heat resistance, it is preferable that the content of repeating unit (b) is in the range of 0.5 to 30% by mole and more preferably in the range of 1 to 20% by mole.

The styrenic copolymer of the present invention having a functional group and the syndiotactic configuration has excellent physical properties such as adhesion with various types of adhesive and compatibility with various types of rubber and can be advantageously used as molded articles in various applications as described later.

The styrenic copolymer of the present invention having a functional group and the syndiotactic configuration can be efficiently produced in accordance with the process of the present invention described above.

The styrenic copolymer of the present invention can be formed into various molded articles. The styrenic copolymer may also be used as compositions comprising conventional thermoplastic resins, rubbery elastomers, antioxidants, inorganic fillers, crosslinking agents, auxiliary crosslinking agents, nucleating agents, plasticizers, compatibilizers, coloring agents and antistatic agents as long as the object of the present invention is not adversely affected.

Examples of the thermoplastic resin include styrenic polymers such as polystyrene having the atactic configuration, polystyrene having the isotactic configuration, AS resins and ABS resins; polyesters such as polyethylene terephthalate; polycarbonates; polyethers such as polyphenylene ethers, polysulfones and polyether sulfones; condensation polymers such as polyamides, polyphenylene sulfides (PPS) and polyoxymethylene; acrylic polymers such as polyacrylic acid, polyacrylic esters and polymethyl methacrylate; polyolefins such as polyethylene, polypropylene, polybutene, poly-4-methylpentene-1 and ethylenepropylene copolymers; polymers of vinyl compounds having halogen atoms such as polyvinyl chloride, polyvinylidene chloride and polyvinylidene fluoride; and mixtures of these polymers.

Examples of the rubbery elastomer include natural rubber; polybutadiene; polyisoprene; polyisobutylene; neoprene; polysulfide rubbers; thiokol rubbers; acrylic rubbers; urethane rubbers; silicone rubbers; epichlorohydrine rubbers; styrene-butadiene block copolymers (SBR); hydrogenated styrene-butadiene block copolymers (SEB); styrene-butadiene-styrene block copolymers (SBS); hydrogenated styrene-butadiene-styrene block copolymers (SEBS); styrene-isoprene block copolymers (SIR); hydrogenated styrene-isoprene block copolymers (SEP); styrene-isoprene-styrene block copolymers (SIS); hydrogenated styrene-isoprene-styrene block copolymers (SEPS); styrene-butadiene random copolymers; hydrogenated styrene-butadiene random copolymers; styrene-ethylene-propylene random copolymers; styrene-ethylene-butylene random copolymers; ethylene-propylene rubbers (EPR); ethylene-propylene-diene rubbers (EPDM); particulate elastomers of the core-shell type such as butadiene-acrylonitrile-styrene core-shell rubbers (ABS), methyl methacrylate-butadiene-styrene core-shell rubbers (MBS), methyl methacrylate-butyl acrylate-styrene core-shell rubbers (MAS), octyl acrylate-butadiene-styrene core-shell rubbers (MABS), alkyl acrylate-butadiene-acrylonitrile-styrene core-shell rubbers (AABS), butadiene-styrene core-shell rubbers (SBR), core-shell rubbers containing siloxanes such as methyl methacrylate-butyl acrylate-siloxane core-shell rubbers; and rubbers obtained by modifying these rubbers.

Among these rubbery elastomers, SBR, SBS, SEB, SEBS, SER, SEP, SIS, SEPS, core-shell rubbers and rubbers obtained by modifying these rubbers are preferably used.

Examples of the modified rubbery elastomer include rubbers obtained by modifying styrene-butyl acrylate copolymer rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene-propylene rubbers (EPR) and ethylene-propylene-diene rubbers (EPDM) with a modifier having a polar functional group. Among these rubbers, rubbers obtained by modifying SEB, SEBS, SEP, SEPS, EPR and EPDM are preferably used. Specific examples of the above rubbers include SEBS modified with maleic anhydride, SEPS modified with maleic anhydride, EPR modified with maleic anhydride, EPDM modified with maleic anhydride, SEBS modified with epoxy group and SEPS modified with epoxy group.

The rubbery elastomer may be used singly or in combination of two or more.

As the antioxidant, various compounds can be used. Preferable examples of the antioxidant include antioxidants having phosphorus and phenolic antioxidants. Examples of the antioxidant having phosphorus include monophosphites and diphosphites such as tris(2,4-di-t-butylphenyl) phosphite and tris(mono-and di-nonylphenyl) phosphites. As the diphosphite, it is preferable that phosphorus compounds represented by the following general formula are used:

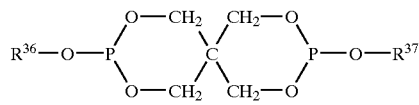

wherein $R^{36}$ and $R^{37}$ each independently represent an alkyl group having 1 to 20 carbon atoms, a cycloalkyl group having 3 to 20 carbon atoms or an aryl group having 6 to 20 carbon atoms.

Specific examples of the phosphorus compound represented by the above general formula include distearylpentaerythritol diphosphite, dioctylpentaerythritol diphospbite, diphenylpentaerythritol diphosphite, bis(2,4-di-t-butylphenyl)pentaerythritol diphosphite, bis(2,6-di-t-butyl-4-methylphenyl)pentaerythritol diphosphite and dicyclohexylpentaerythritol diphosphite.

As the phenolic antioxidant, conventional phenolic antioxidants can be used. Examples of the phenolic antioxidant include 2,6-di-t-butyl-4-methylphenol, 2,6-diphenyl-4-methoxyphenol, 2,2'-methylenebis(6-t-butyl-4-methylphenol), 2,2'-methylenebis(6-t-butyl-4-methylphenol), 2,2'-methylenebis[4-methyl-6-(α-methylcyclohexyl)phenol], 1,1-bis(5-t-butyl-4-hydroxy-2-methylphenyl)butane, 2,2'-methylenebis(4-methyl-6-cyclohexylphenol), 2,2'-methylenebis(4-methyl-6-nonylphenol), 1,1,3-tris(5-t-butyl-4-hydroxy-2-methylphenyl)butane, 2,2-bis(5-t-butyl-4-hydroxy-2-methyl-phenyl)-4-n-dodecylmercaptobutane, ethylene glycol-bis[3,3-bis(3-t-butyl-4-hydroxyphenyl) butyrate], 1,1-bis(3,5-dimethyl-2-hydroxyphenyl)-3-(n-dodecylthio)butane, 4,4'-thiobis(6-t-butyl-3-methylphenol), dioctadecyl 1,3,5-tris(3,5-di-t-butyl-4-hydroxybenzyl)-2,4,6-trimethylbenzene, dioctadecyl 2,2-bis(3,5-di-t-butyl-4-hydroxybenzyl)malonate, n-octadecyl 3-(4-hydroxy-3,5-di-t-butylphenyl)propionate and tetrakis[methylene (3,5-di-t-butyl-4-hydroxyhydrocinnamate)]methane.

As antioxidants other than the antioxidants having phosphorus and the phenolic antioxidants described above, amine antioxidants and antioxidants containing sulfur may be used singly or as a mixture.

The above antioxidant is used, in general, in an amount of 0.0001 to 1 part by weight per 100 parts by weight of the styrenic copolymer of the present invention. When the amount is less than 0.0001 part by weight, a marked decrease in the molecular weight takes place. When the amount exceeds 1 part by weight, mechanical strength is adversely affected. Therefore, amounts outside the above range are not preferable.

As the inorganic filler, any of fillers having a fiber shape, granular fillers and powder fillers may be used. Examples of the inorganic filler having a fiber shape include glass fibers, carbon fibers and alumina fibers. Examples of the granular fillers and the powder fillers include talc, carbon black, graphite, titanium dioxide, silica, mica, calcium carbonate, calcium sulfate, barium carbonate, magnesium carbonate, magnesium sulfate, barium sulfate, oxysulfates, tin oxides, alumina, kaolin, silicon carbide and metal powders.

The shape of the molded article prepared from the styrenic copolymer of the present invention is not particularly limited. For example, the molded article may be a sheet, a film, a fiber, a non-woven fabric, a container or an article prepared in accordance with the injection molding or the blow molding.

As the process for producing a molded article from the styrenic copolymer of the present invention, various processes can be used. The following processes can be advantageously used. The above styrenic copolymer or a composition prepared by adding various components described above to the styrenic copolymer is preliminarily formed into a preliminarily molded article for the heat treatment (a film, a sheet or a container). In this process, the material for the molding prepared above is melted by heating and extruded into a suitable shape. A film or a sheet can be prepared in accordance with the T-die molding process and other structural articles such as a container can be prepared in accordance with the injection molding process. As the extrusion machine used in the above molding processes, any of a single screw extruder and a twin-screw extruder with or without vents can be used. The condition of the extrusion is not particularly limited and can be suitably selected in accordance with the situation. It is preferable that the temperature during the melting is selected in the range of the melting point of the material used for the molding to the temperature higher than the decomposition point by 50° C. and the shearing stress is selected at $5 \times 10^7$ $\mu$N/cm$^2$ or lower since the preliminarily molded article for the heat treatment can be obtained with little formation of rough surfaces.

After the above extrusion and molding, it is preferable that the obtained preliminarily molded article for the heat treatment is solidified by cooling. As the medium for cooling, various media such as a gas, a liquid and a metal can be used. When the preliminarily molded article for the heat treatment is prepared in accordance with a sheet molding process using a metal roll, using an air knife, an air chamber or a touch roll or applying static electricity is effective for preventing formation of uneven thickness or a waved shape. The temperature of solidification by cooling is, in general, in the range of 0° C. to a temperature higher than the glass transition temperature of the preliminarily molded article for the heat treatment by 30° C. and preferably in the range of a temperature lower than the transition temperature by 70° C. to the glass transition temperature. The rate of cooling is not particularly limited. The rate of cooling is selected, in general, in the range of 200 to 3° C./second and preferably in the range of 200 to 10° C./second.

The preliminarily molded article for the heat treatment may have various shapes. In general, the preliminarily molded article for the heat treatment is a sheet, a film or a container such as a tube and a tray having a thickness of 5 mm or smaller and preferably 3 mm or smaller. When the preliminarily molded article for the heat treatment has a thickness exceeding 5 mm before the heat treatment, crystallization occasionally takes place during preparation of the preliminarily molded article for the heat treatment and a turbid product is obtained. The degree of crystallization of the preliminarily molded article for the heat treatment is 20% or smaller and preferably 15% or smaller. When the degree of crystallization of the preliminarily molded article for the heat treatment exceeds 20%, transparency of the molded article of the styrenic copolymer obtained after the heat treatment is not sufficient.

The molded article can be obtained by the heat treatment of the preliminarily molded article for the heat treatment prepared above at a temperature in the range of 140 to 180° C. and preferably in the range of 150 to 170° C. When the temperature of the heat treatment is lower than 140° C., heat resistance is insufficient and a turbid product is occasionally obtained. When the temperature of the heat treatment exceeds 180° C., transparency is insufficient. The time of the heat treatment is, in general, in the range of 1 second to 30 minutes and preferably in the range of 1 second to 10 minutes. When the temperature is raised, it is preferable that the preliminarily molded article for the heat treatment is heated in a manner such that the temperature of the article rapidly reaches the prescribed temperature of the heat treatment. From this standpoint, the rate of raising the temperature is, in general, 30° C./minute or greater and preferably 50° C./minute or greater. When the rate of raising the temperature is smaller than 30° C./minute, the heat treatment takes place at temperatures lower than the prescribed temperature and transparency of the molded article of the styrenic copolymer is occasionally adversely affected. The method of heating in the heat treatment is not particularly limited. For example, the preliminarily molded article for the heat treatment is brought into contact with a medium for heating such as a gas, a liquid and a metal at a temperature in the range of 120 to 200° C. The molded article of the styrenic copolymer which has been subjected to the heat treatment under the above condition may be subjected to a further heat treatment, where necessary. In the further heat treatment, it is preferable that the temperature is in the range of the glass transition temperature to the melting point and the time is 1 second or longer. The heat deformation temperature of the molded article of the styrenic copolymer can be improved without adverse effects on transparency by the further heat treatment although improvement in the degree of crystallization cannot be expected.

EXAMPLES

The present invention will be described more specifically with reference to examples in the following. However, the present invention is not limited to the examples.

The melting point and the adhesive property of the copolymers obtained in the examples were obtained in accordance with the following methods.

(1) Melting Point

Using an instrument "DSC7" manufactured by Perkin Elmer Company, a sample was kept at 50° C. for 1 minute, then heated at a rate of 20° C./minute until the temperature reached 300° C., kept at 300° C. for 5 minutes, then cooled at a rate of 20° C./minute until the temperature reached 50° C., kept at 50° C. for 1 minute and then heated at a rate of 20° C./minute until the temperature reached 300° C. The temperature at the top of the endothermic peak during the second heating in the above operation was used as the melting point.

(2) Adhesive Property

A sample polymer was heated under compression at 300° C. for 8 minutes. The heated sample was immediately transferred to a compression molding machine at 40° C. and a sheet having a thickness of 1 mm was prepared. The surface of the prepared sheet was coated with an adhesive "TSE322" manufactured by TOSHIBA SILICONE Co., Ltd. and the coated sheet was kept in a drying oven at 120° C. for 2 hours so that the adhesive was cured.

The adhesive property was evaluated by peeling the cured layer of the adhesive from the sheet. When a portion of the adhesive layer remained on the surface of the sheet after the adhesive layer was peeled off or the adhesive layer could not be peeled off, the adhesive property was evaluated as "good". When the adhesive layer was completely separated from the surface of the sheet, the adhesive property was evaluated as "poor".

Preparation Example 1

Preparation of a Mixed Titanium Catalyst

Into a vessel sufficiently dried and purged with nitrogen, 3.8 mmoles of triisobutylaluminum as the organometallic compound of component (C), 16.5 mmoles of methylaluminoxane as the compound having oxygen of component (B) and 0.15 mmoles of 1,2,3,4,5,6,7,8-octahydrofluorenyltitanium trimethoxide as the transition metal complex compound of component (A) were placed and the concentrations were adjusted so that the concentration of the catalyst was 3 mmoles/liter. After the components were mixed, the mixture was stirred for 1 hour and a mixed titanium catalyst was prepared.

Example 1

Under the atmosphere of nitrogen, 79 ml (158 mmoles) of a toluene solution of triisobutylaluminum having a concentration of 2.0 moles/liter was added to 88 ml of toluene at the room temperature. Then, 9.04 g (31.6 mmoles) of (4-vinylphenyl)-1,1-diphenylmethanol was added slowly and the resultant mixture was stirred at the room temperature for 10 minutes.

To the above mixture, 200 ml of styrene was added and the temperature of the resultant mixture was raised to 65° C. After the temperature was kept at this temperature for 10 minutes, 2.53 ml of the mixed titanium catalyst prepared in Preparation Example 1 was added. After the polymerization was conducted at 65° C. for 60 minutes, the polymerization was terminated by adding methanol. The obtained polymer was washed with methanol, dried in an open atmosphere for one night and dried in vacuo at 200° C. for 2 hours and 14 g of the polymer was obtained.

The obtained polymer was subjected to the measurement in accordance with $^1$H-NMR using trichlorobenzene as the solvent. A peak assigned to hydroxyl group was found at around 3.3 ppm. The content of the unit of the comonomer was obtained from this peak.

The properties of the obtained polymer and the content of the unit of the comonomer are shown in Table 1.

Example 2

The same procedures as those conducted in Example 1 were conducted except that 7.4 g (31.6 mmoles) of 3,5-di-tert-butyl-4-aminostyrene was added in place of 9.04 g (31.6 mmoles) of (4-vinylphenyl)-1,1-diphenylmethanol and 12 g of a polymer was obtained.

The properties of the obtained polymer and the content of the unit of the comonomer are shown in Table 1.

Comparative Example 1

A toluene solution of (4-vinylphenyl)-1,1-diphenylmethanol having a concentration of 0.1 mole/liter was prepared in accordance with the same procedures as those conducted in Example 1 except that triisobutylaluminum was not used and the polymerization was conducted after adding styrene and the mixed titanium catalyst in accordance with the same procedures as those conducted in Example 1. A polymer was obtained only in a trace amount.

Comparative Example 2

Under the atmosphere of nitrogen, 200 ml of styrene was added to 100 ml of toluene. After the temperature was raised to 65° C., 5 ml of the mixed titanium catalyst prepared in Preparation Example 1 was added.

After the polymerization was conducted at 65° C. for 3 minutes, the polymerization was terminated by adding methanol. The obtained polymer was washed with methanol, dried in an open atmosphere for one night and dried in vacuo at 200° C. for 2 hours and 20 g of the polymer was obtained.

The properties of the obtained polymer are shown in Table 1.

Example 3

Under the atmosphere of nitrogen, 8.9 ml of a toluene solution of triisobutylaluminum having a concentration of 2.0 moles/liter was added to 88 ml of toluene at the room temperature. Then, 2.80 g of 4-vinylbenzyl-N,N-dimethylamine was added slowly and the resultant mixture was stirred at the room temperature for 10 minutes.

To the above mixture, 200 ml of styrene was added and the temperature of the resultant mixture was raised to 65° C. After the temperature was kept at this temperature for 10 minutes, 3.3 ml of the mixed titanium catalyst prepared in Preparation Example 1 was added. After the polymerization was conducted at 65° C. for 40 minutes, the polymerization was terminated by adding methanol. The obtained polymer was washed with methanol, dried in an open atmosphere for one night and dried in vacuo at 200° C. for 2 hours and 6.7 g of the polymer was obtained.

The obtained polymer was subjected to the measurement in accordance with $^1$H-NMR using trichlorobenzene as the solvent. A peak assigned to dimethylamino group was found at around 2.2 ppm. The content of the unit of the comonomer was obtained from this peak.

The properties of the obtained polymer and the content of the unit of the comonomer are shown in Table 1.

Example 4

Under the atmosphere of nitrogen, 14.4 ml of a toluene solution of triisobutylaluminum having a concentration of 2.0 moles/liter, 5.4 ml of t-butoxystyrene and 50 ml of styrene were mixed together and the resultant mixture was stirred at 60° C. for 10 minutes. To the mixture, 4.13 ml of the mixed titanium catalyst prepared in Preparation Example 1 was added. After the polymerization was conducted at 60° C. for 2 hours, the polymerization was terminated by adding methanol. The obtained polymer was washed with methanol, dried in an open atmosphere for one night and dried in vacuo at 200° C. for 2 hours and 1.6 g of the polymer was obtained.

The obtained polymer was subjected to the measurement in accordance with $^1$H-NMR using trichlorobenzene as the solvent. A peak assigned to t-butyl group was found at around 1.3 ppm. The content of the unit of the comonomer was obtained from this peak.

The properties of the obtained polymer and the content of the unit of the comonomer are shown in Table 1.

Example 5

Under the atmosphere of nitrogen, 43.5 ml of a toluene solution of triisobutylaluminum having a concentration of 2.0 moles/liter was added to 30 ml of toluene at the room temperature. Then, 5.84 g of 4-vinylbenzyl alcohol was added and the resultant mixture was stirred at the room temperature for 10 minutes.

To the above mixture, 50 ml of styrene was added. After the temperature of the resultant mixture was raised to 60° C., 3.73 ml of the mixed titanium catalyst prepared in Preparation Example 1 was added. After the polymerization was conducted at 60° C. for 2 hours, the polymerization was terminated by adding methanol. The obtained polymer was washed with methanol, dried in an open atmosphere for one night and dried in vacuo at 200° C. for 2 hours and 0.20 g of the polymer was obtained.

The obtained polymer was subjected to the measurement in accordance with $^1$H-NMR using trichlorobenzene as the solvent. A peak assigned to hydroxyl group was found at around 4.0 ppm. The content of the unit of the comonomer was obtained from this peak.

The properties of the obtained polymer and the content of the unit of the comonomer are shown in Table 1.

Example 6

Under the atmosphere of nitrogen, 8.9 ml of a toluene solution of triisobutylaluminum having a concentration of 2.0 moles/liter was added to 88 ml of toluene at the room temperature. Then, 2.22 ml of 4-vinylbenzaldehyde was added slowly and the resultant mixture was stirred at the room temperature for 10 minutes.

To the above mixture, 200 ml of styrene was added and the temperature of the resultant mixture was raised to 65° C. After the temperature was kept at this temperature for 10 minutes, 10 ml of the mixed titanium catalyst prepared in Preparation Example 1 was added. After the polymerization was conducted at 65° C. for 10 minutes, the polymerization was terminated by adding methanol. The obtained polymer was washed with methanol, dried in an open atmosphere for one night and dried in vacuo at 200° C. for 2 hours and 20.8 g of the polymer was obtained.

The properties of the obtained polymer are shown in Table 1.

TABLE 1

| | Content of unit of comonomer (% by mole) | Melting point (° C.) | Adhesive property |
|---|---|---|---|
| Example 1 | 2.2 | 269.7 | good |
| Example 2 | 1.8 | 268.2 | good |
| Example 3 | 0.7 | 267.1 | good |
| Example 4 | 7.0 | — | good |
| Example 5 | 15.0 | — | good |
| Example 6 | — | 271.1 | good |
| Comparative Example 2 | 0 | 271.7 | poor |

INDUSTRIAL APPLICABILITY

In accordance with the present invention, a styrenic copolymer having a functional group which is a random, block or graft copolymer, preferably a random copolymer, of the vinyl compound having a functional group and the styrenic compound and in which the repeating unit derived from the styrenic compound have the syndiotactic configuration can be efficiently produced.

The random styrenic copolymer having a functional group and the syndiotactic configuration exhibits excellent physical properties such as excellent adhesion with various adhesives and excellent compatibility with various rubbers and can be advantageously used in various applications as various types of molded articles.

What is claimed is:

1. A process for producing a styrenic copolymer having a functional group and a syndiotactic configuration, the process comprising bringing a metal compound into interaction with a vinyl compound having a functional group to mask the functional group, and copolymerizing the vinyl compound in the presence of a polymerization catalyst comprising (A) a transition metal compound, (B) at least one compound selected from the group consisting of compounds having oxygen and compounds which can form ionic complex compounds by reaction with the transition metal compound, and (C) an organometallic compound.

2. The process according to claim 1, wherein the styrenic copolymer is a styrenic random copolymer.

3. The process according to claim 1, wherein the vinyl compound having a functional group is a compound represented by formula (1):

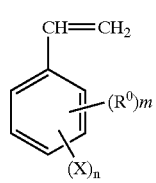

(I)

wherein X represents a functional group which can be masked with the metal compound; $R^0$ represents a hydrocarbon group; when a plurality of X are present, X may be the same or different; when a plurality of $R^0$ are present, $R^0$ may be the same or different; n represents an integer of 1 to 5; m represents an integer of 0 to 4; and n+m≦5.

4. The process according to claim 3, wherein, in formula (I), X represents a substituent having —OR$^1$, —COR$^1$, —CO$_2$R$^1$, —CN, —NR$^1$R$^2$, —SR$^1$ or —PR$^1$R$^2$, R$^1$ and R$^2$ each representing hydrogen atom, an alkyl group having 1 to 20 carbon atoms, an aryl group having 6 to 20 carbon atoms or an alkylsilyl group having 3 to 20 carbon atoms.

5. The process according to claim 3, wherein, in formula (I), X represents a group represented by —(CR$^3$R$^4$)$_p$—D, D representing a substituent having —OR$^1$, —COR$^1$, —CO$_2$R$^1$, —CN, —NR$^1$R$^2$, —SR$^1$ or —PR$^1$R$^2$, R$^3$ and R$^4$ each representing an alkyl group having 1 to 20 carbon atoms, an aryl group having 6 to 20 carbon atoms or an alkylsilyl group having 3 to 20 carbon atoms, R$^1$ and R$^2$ each representing hydrogen atom, an alkyl group having 1 to 20 carbon atoms, an aryl group having 6 to 20 carbon atoms or an alkylsilyl group having 3 to 20 carbon atoms, p representing an integer of 1 to 10 and, when a plurality of —CR$^3$R$^4$ are present, —CR$^3$R$^4$ may be the same or different.

6. The process according to claim 3, wherein, in formula (I), X represents a group represented by —Z(QR$^5$R$^6$R$^7$)$_q$, Z representing O, N or S, Q representing C, Si or Sn, R$^5$ to R$^7$ each representing an alkyl group having 1 to 20 carbon atoms, an aryl group having 6 to 20 carbon atoms or an alkylsilyl group having 3 to 20 carbon atoms, q representing 1 or 2, and, when q represents 2 the two QR$^5$R$^6$R$^7$ may be the same or different.

7. The process according to claim 1, wherein the metal compound is an aluminum compound.

8. The process according to claim 1, wherein, after the copolymerization has been completed, a reaction product is brought into contact with an aqueous solution or an alcohol.

* * * * *